US008259239B2

(12) United States Patent
Hua

(10) Patent No.: US 8,259,239 B2
(45) Date of Patent: Sep. 4, 2012

(54) POLARIZED HEAD-MOUNTED PROJECTION DISPLAY

(75) Inventor: Hong Hua, Tucson, AZ (US)

(73) Assignee: The Arizona Board of Regents on Behalf of The University of Arizona, Tucson, AZ (US)

(*) Notice: Subject to any disclaimer, the term of this patent is extended or adjusted under 35 U.S.C. 154(b) by 548 days.

(21) Appl. No.: 12/522,262

(22) PCT Filed: Jan. 18, 2008

(86) PCT No.: PCT/US2008/051453
§ 371 (c)(1),
(2), (4) Date: Jul. 7, 2009

(87) PCT Pub. No.: WO2008/089417
PCT Pub. Date: Jul. 24, 2008

(65) Prior Publication Data
US 2010/0002154 A1    Jan. 7, 2010

Related U.S. Application Data

(60) Provisional application No. 60/880,980, filed on Jan. 18, 2007.

(51) Int. Cl.
*G02F 1/1335* (2006.01)
(52) U.S. Cl. .............. 349/11; 349/9; 349/57; 349/96; 349/117

(58) Field of Classification Search .................. 349/11, 349/9, 8, 117, 57, 58, 62, 95, 96
See application file for complete search history.

(56) References Cited

U.S. PATENT DOCUMENTS

| 5,223,956 | A | * | 6/1993 | Kramer et al. ............... 359/17 |
| 5,383,053 | A | * | 1/1995 | Hegg et al. ............. 359/485.05 |
| 5,526,184 | A | * | 6/1996 | Tokuhashi et al. ........... 359/630 |
| 5,719,588 | A | * | 2/1998 | Johnson ......................... 345/8 |
| 5,912,650 | A | * | 6/1999 | Carollo ......................... 345/7 |
| 6,634,756 | B1 | | 10/2003 | Shimizu |
| 2006/0221445 | A1 | | 10/2006 | DiZio et al. |
| 2006/0290889 | A1 | | 12/2006 | Robinson et al. |

* cited by examiner

*Primary Examiner* — Thoi Duong
(74) *Attorney, Agent, or Firm* — Oblon, Spivak, McClelland, Maier & Neustadt, L.L.P.

(57) ABSTRACT

An image display system and associated method for image displaying The system includes an image source configured to generate image light, projection optics configured to project the image light, and a polarizing beam splitter optically coupled to the projection optics and configured to propagate into a first optical path first polarized light having a first polarization and to propagate into a second optical path second polarized light having a second polarization The system includes a quarter wave converter disposed in the first optical path and configured to rotate the first polarization by a quarter phase as the first polarized light first passes through the quarter wave converter, and includes a reflective screen disposed in the first optical path and configured to reflect rotated first polarized light from the quarter wave converter back through the quarter wave converter for further quarter phase rotation.

36 Claims, 18 Drawing Sheets

FIGURE 2D

Table 1. Specification of the p-HMPD optical system

|  | Parameter description | Specification |
|---|---|---|
| Microdisplay | Type | Active Matrix LCD, backlighting |
|  | Active display area | 26.4 mm (width) x 19.8 mm (height), 33 mm (diagonal) |
|  | Pixel resolution | (640 x 3) x480 pixels |
|  | Pixel size | ~42 µm, square |
| Projection optics | Effective focal length | 28.6–35.3 mm |
|  | Entrance pupil diameter | 10~12 mm |
|  | Entrance pupil distance | 5~10 mm |
|  | Back focal length | >24 mm |
|  | Total number of optical elements | 3~4 |
| PBS | Size | 64 mm x 45 mm |
|  | S-polarization reflection | >90% |
|  | P-polarization transmission | >85% |
| Retarder | Retardance | Quarter-wave (broadband) |
|  | Size | 60 mm x 45 mm |
| System | Wavelength | visible |
|  | FOV | 50~60 degrees (diagonal) |
|  | Distortion | <5% over the entire FOV |
|  | Modulation transfer function (MTF) | >30% @ 12.5 lps/mm (given by the pixel size of the microdisplay) |
|  | Spot size (RMS) | <42 µm |
|  | Eye clearance | 20~25mm |

POLARIZED HEAD-MOUNTED PROJECTION DISPLAY

CROSS REFERENCE TO RELATED APPLICATIONS

This invention is related to and claims priority to U.S. Ser. No. 60/880,980, entitled "Design of a Bright Polarized Head-Mounted Projection Display," filed Jan. 18, 2007. The entire contents of U.S. Ser. No. 60/880,980 are incorporated herein by reference.

STATEMENT REGARDING FEDERALLY SPONSORED RESEARCH

This invention was made with government support under IIS0534777 awarded by the National Science Foundation. The government has certain rights in the invention.

BACKGROUND OF THE INVENTION

1. Field of the Invention

This invention is related to the field of head-mounted displays (HMD) and methods of manufacturing such displays.

2. Description of the Related Art

Mixed- and augmented reality (MR-AR) technology is a paradigm where computer-generated digital information is selectively superimposed upon a real-world scene to supplement a user's sensory perception of the physical environment. It has been explored for a wide range of applications for 3D scientific visualization, medical training, and engineering processes. One of the enabling technologies in MR-AR systems is a 3D display that is able to seamlessly combine virtual and real information, which is called creating "see-through" capability.

Optical see-though head-mounted displays (OST-HMD) have been one of the basic approaches to combining computer-generated virtual objects with the views of real-world scenes required for MR-AR systems. In an OST-HMD, the direct view of the physical world is maintained and computer-generated virtual images are optically superimposed onto the real scene via an optical combiner. This optical approach allows a user to see the real world in full resolution and introduces less intrusion into the view of the real world than video see-through displays where real-world views are captured through video cameras. Therefore, an OST-HMD system is a system suitable for tasks where eye-hand coordination or non-blocked real-world view is critical.

Designing a wide field-of-view (FOV), compact and non-intrusive OST-HMD, has been a challenge. One head-mounted projection display (HMPD) that deviates from the conventional approaches to HMD designs is illustrated in FIG. 1 as a monocular HMPD configuration. FIG. 1 is a schematic illustration of a monocular head-mounted projection display 10 receiving an image to be displayed from an image source 12. Two major aspects distinguish the HMPD technology from conventional HMDs and projection systems: 1) projection optics 14 replace an eyepiece- or microscope-type lens system in the conventional HMD design, and 2) a retroreflective screen 16 substitutes for a typical diffusing screen in the conventional projection system. The projected light 18 is thus directly retroreflected back to the exit pupil 20 of the projection display 10 where the eye is positioned to view the projected image 22 through beam splitter 24. This combination of projection and retroreflection not only enables stereoscopic capability but also provides intrinsically correct occlusion of computer-generated objects by real ones and offers the capability of designing wide FOV, low distortion optical see-through displays.

However, the images appearing on optical see-through displays commonly lack brightness and contrast compared to the direct view of a real-world scene. While the luminance level of an immersive HMD is usually required to be equal to or greater than about 17 $cd/m^2$ for optimal visual acuity, the image brightness of an OST-HMD should match the average luminance level of its working environments. The average luminance of outdoor scenes is typically about 5000 to 6000 $cd/m^2$, and a well-lit indoor environment approximately averages 400~500 $cd/m^2$. State-of-the-art microdisplays suitable for HMDs yield 100 $cd/m^2$ of luminance on average for back-lit active-matrix liquid crystal displays (AMLCD), 300 to 1000 $cd/m^2$ for liquid crystal on silicon (LCOS) displays, and 50 to 600 $cd/m^2$ for organic light emitting displays (OLED).

The problem of low image brightness and contrast is worsened by any light attenuation through any optical combiner interface required in see-through displays, resulting in low luminance transfer efficiency of the optical system. In conventional OST-HMDs, a 50/50 beamsplitter will attenuate the light, from both a displayed image and the real scene, by 50%. Consequently, such displays are usually used in dim environments, reducing the feasibility of applying such information displays outdoor or in scenarios where well-lit environments such as in an operation room are necessary.

The low-efficiency problem is aggravated in a see-through HMPD in which the projected light is split twice through beam splitter 24 as illustrated in FIG. 1. Using a 50/50 beam splitter leads to the loss of at least 75% of the light from a displayed image and 50% of the light from the real scene. The light from the displayed image is further attenuated by as high as 80% through an imperfect retroreflective screen. The actual luminance returned back to the exit pupil is around 4~10% or less of the display luminance. For instance, providing the usage of AMLCDs, the observed peak luminance is about 4 to 10 $cd/m^2$ or lower. This luminance imposes significant restrictions on the lighting conditions of working environments and limits applications demanding well-lit environments.

The following references, whose contents in entirety are incorporated herein by reference, represent background techniques and procedures used conventionally for head-mounted displays:

1. J. P. Rolland, and H. Fuchs, "Optical versus video see-through head-mounted displays in medical visualization," *Presence: Teleoperators and Virtual Environments (MIT Press)*, 9(3), 287-309, 2000.
2. R. Fisher, "Head-mounted projection display system featuring beam splitter and method of making same," U.S. Pat. No. 5,572,229, 1996.
3. J. Fergason. "Optical system for head mounted display using retro-reflector and method of displaying an image", U.S. Pat. No. 5,621,572. Apr. 15, 1997.
4. H. Hua, A. Girardot, C. Gao, and J. P. Rolland "Engineering of head-mounted projective displays". *Applied Optics*, 39 (22), pp. 3814-3824, 2000.
5. H. Hua, C. Gao, and J. P. Rolland, "Study of the imaging properties of retro-reflective materials used in head-mounted projective displays (HMPDs)," in *Aerosense* 2002, April 1-5 th, Orlando, Fla.
6. H. Hua and C. Gao, "A polarized head-mounted projective displays," in *Proc. of IEEE and ACM International Symposium on Mixed and Augmented Reality* 2005, pp. 32-35, 2005.

7. R. Kijima and T. Ojika, "Transition between virtual environment and workstation environment with projective head-mounted display", *Proc. of IEEE VR* 1997, pp. 130-137, 1997.
8. J. Parsons and J. P. Rolland, "A non-intrusive display technique for providing real-time data within a surgeons critical area of interest," *Proc. of Medicine Meets Virtual Reality* 1998, 246-251, 1998.
9. N. Kawakami, M. Inami, D. Sekiguchi, Y. Yangagida, T. Maeda, and S. Tachi, "Object-oriented displays: a new type of display systems—from immersive display to object-oriented displays", *Proc. of IEEE SMC* 1999, IEEE International Conference on Systems, Man, and Cybernetics, Vol. 5, pp. 1066-9, 1999.
10. M. Inami, N. Kawakami, D. Sekiguchi, Y. Yanagida, T. Maeda, and S. Tachi, "Visuo-haptic display using head-mounted projector", *Proc. IEEE Virtual Reality* 2000, pp. 233-40, 2000.
11. D. Poizat and J. P. Rolland, "Use of retro-reflective sheets in optical system design," Technical report TR98-006, University of Central Florida, Orlando, Fla., 1998.
12. H. Hua, Y. Ha, and J. P. Rolland, "Design of an ultralight and compact projection lens," *Applied Optics*, 42(1), 1-12, 2003.
13. H. Hua, C. Gao, F. Biocca, and J. P. Rolland, "An Ultra-light and Compact Design and Implementation of Head-Mounted Projective Displays," *Proc. of IEEE VR* 2001, pp. 175-182, 2001.
14. Y. Ha, Hong Hua, R. Martins, and J. P. Rolland, "Design of a wearable wide-angle projection color display," in *Proc. of International Optical Design Conference* 2002 (*IODC*), 2002.
15. J. P. Rolland, F. Biocca, F. Hamza-Lup, Y. Ha, and R. Martins, "Development of head-mounted projection displays for distributed, collaborative, augmented reality applications," *Presence: Teleoperators and Virtual Environments,* 14(5), 528-549, 2005.
16. R. Martins, V. Shaoulov, Y. Ha, and J. P. Rolland, "Projection-based head-mounted displays for wearable computers," *Proc. of SPIE*, Vol. 5442, pp. 104-110, 2004.
17. C. Curatu, H. Hua, and J. P. Rolland, "Projection-based head-mounted display with eye-tracking capabilities," *Proc. of SPIE*, Vol. 5875, 2005.
18. M. Inami, N. Kawakami, and S. Tachi, "Optical camouflage using retro-reflective projection technology," *Proc. of ISMAR* 2003, pp. 348-349, 2003.
19. H. Hua, L. Brown, & C. Gao, "System and interface framework for SCAPE as a collaborative infrastructure," *Presence. Teleoperators and Virtual Environments,* 13(2), 234-250, April 2004.

SUMMARY OF INVENTION

In one embodiment of the invention, there is provided an image display system including an image source configured to generate image light, projection optics configured to project the image light, and a polarizing beam splitter optically coupled to the projection optics and configured to propagate into a first optical path first polarized light having a first polarization and to propagate into a second optical path second polarized light having a second polarization. The system includes a quarter wave converter disposed in the first optical path and configured to rotate the first polarization by a quarter phase as the first polarized light first passes through the quarter wave converter, and includes a reflective screen disposed in the first optical path and configured to reflect rotated first polarized light from the quarter wave converter back through the quarter wave converter for further quarter phase rotation. Image light of the rotated first polarized light is converted to converted image light of the second polarization, and the converted image light of the second polarization is propagated in the first optical path back to the polarizing beam splitter for propagation by the polarizing beam splitter. The system includes an output port disposed in the first optical path and configured to receive the converted image light of the second polarization propagated by the beam splitter.

In one embodiment of the invention, there is provided a method for image displaying that includes generating image light from an image source, projecting and focusing the image light from the image source, splitting at a beam splitter first polarized light of the image light having a first polarization into a first optical path and second polarized light of the image light having a second polarization into a second optical path, reflecting the first polarized light in the first optical path as a virtual image of the image light being focused, converting the first polarized light into the second polarized light, and propagating the second polarized light by the beam splitter for viewing of the virtual image.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2D is a table depicting exemplary guidelines for the optical elements of the invention;

DETAILED DESCRIPTION OF THE EMBODIMENTS

In one embodiment of the invention, there is provided a polarized head-mounted projection display (p-HMPD) system. The images from a p-HMPD system of the invention can potentially be three-times brighter than those in existing HMPD designs. The p-HMPD system of the invention is able to substantially improve image brightness, contrast, and color vividness. Furthermore, in one embodiment of the invention, there is provided a compact optical system and helmet system for the p-HMPD system.

The p-HMPD system of the invention addresses the image brightness problems in conventional systems, and significantly improves the luminance efficiency of the display by applying polarization techniques for image projection. The observed image through the polarized system can potentially be three-times brighter than existing non-polarizing HMPD designs.

Design of a Polarized HMPD

Consider a pixel on a microdisplay. Denote the viewing angle subtended by the chief ray of the given pixel in the eye space as θ, which characterizes the FOV of an HMPD system. The luminous flux of the pixel collected by the exit pupil of an HMPD system can be described by $$\Phi_v(\theta) = r_{B\text{-}trans}(\theta) r_{retro}(\theta) r_{B\text{-}refl}(\theta) \alpha_{eff}(\theta) \Phi_I(\theta), \quad (1)$$

where $\Phi_I$ is the luminous flux collected by the projection system from the given pixel on the microdisplay, $\alpha_{eff}$ is the transmittance of the projection system, $r_{B\text{-}refl}$ and $r_{B\text{-}trans}$ are the reflectance and transmittance of the beamsplitter, respectively, and $r_{retro}$ is the retroreflectance of the retroreflective screen. $r_{B\text{-}refl}$, $r_{B\text{-}trans}$ and $r_{retro}$ depend on the viewing angle or the incidence angle upon the associated optical surfaces.

The transmittance of a well-designed projection system can typically be around 80% or higher. A theoretical 50/50 beam splitter will lead to a 75% loss of the light due to the dual pass through the beam splitter (see FIG. 1), even without taking into account factors such as absorption and reflection loss. A further light loss, varying from 50% to 80%, is observed from the currently available retroreflective materials. Therefore, the accumulative light efficiency in existing HMPD designs is approximately 4~10%. The variation of 4~10% mainly depends on the retroreflectance of the screen. The low efficiencies of the beam splitter and the retroreflective screen account for the major luminance attenuation. Minimizing the loss from the beam splitter by the techniques of the invention will improve the efficiency of luminance transfer in an HMPD system.

In order to address the image brightness problems in conventional display systems, a display of the invention, referred to herein as a polarized HMPD (p-HMPD), configures the polarization states of the display system to increase the efficiency of reflection and transmission.

Figure 1:
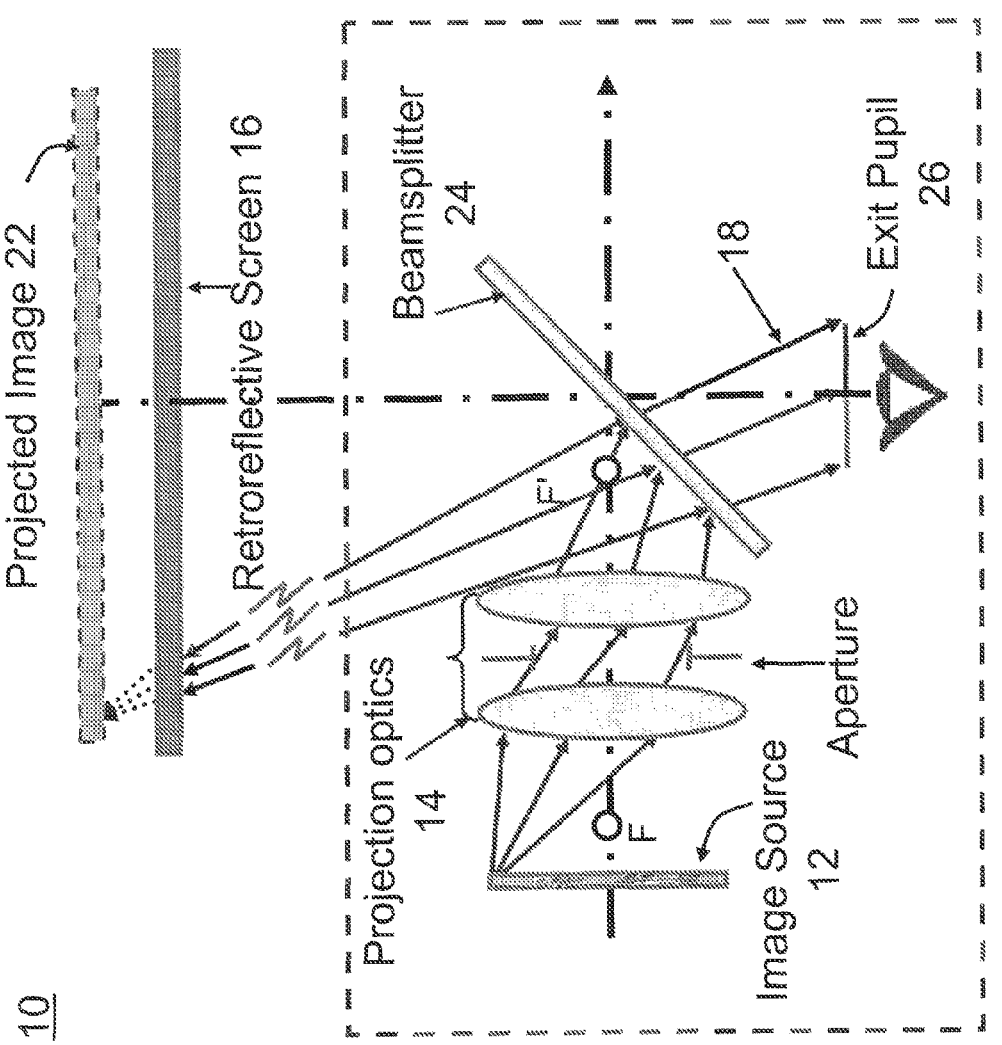
FIG. 1 is a schematic illustration of a monocular head-mounted projection display.
Figure 2A:
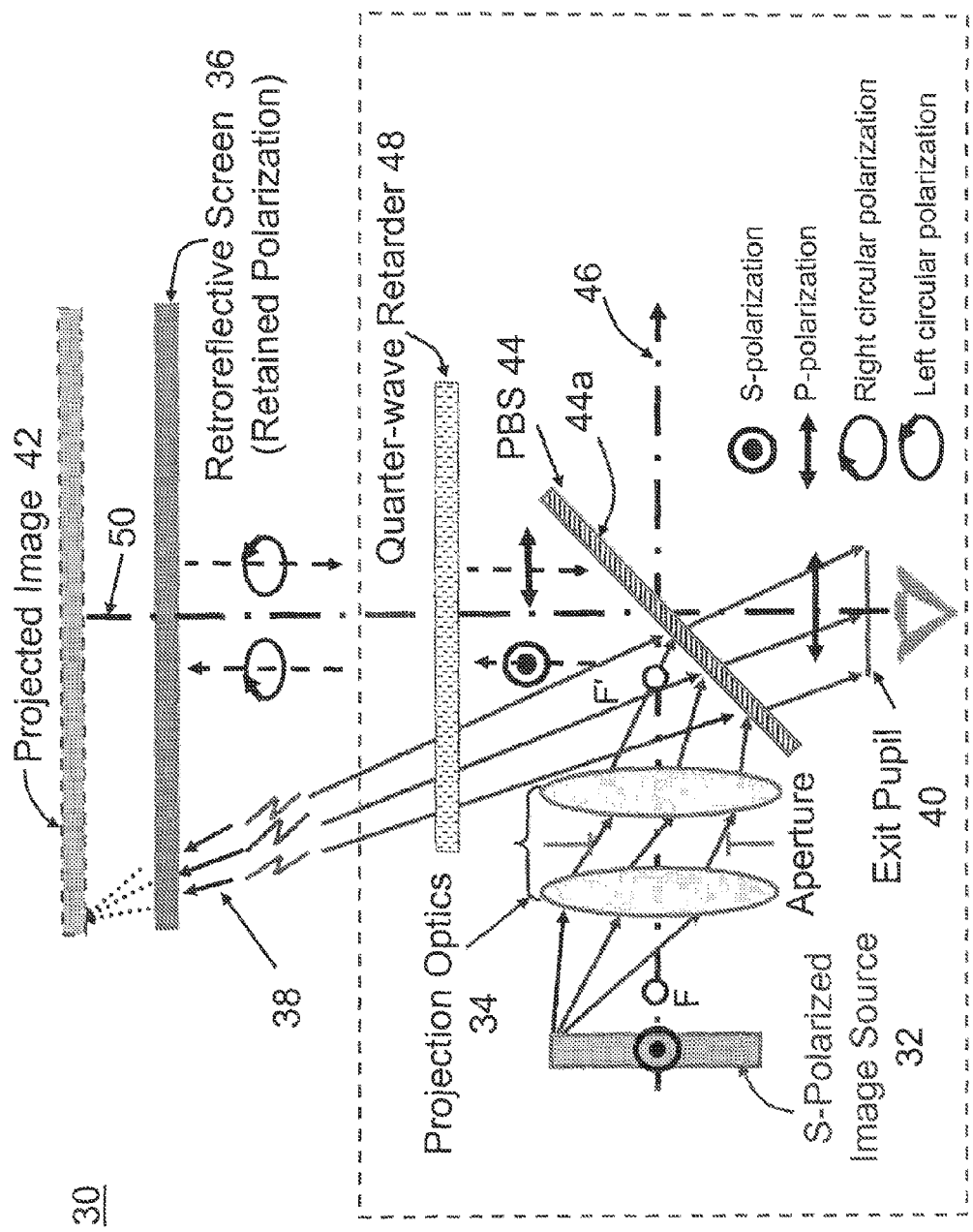
FIG. 2A is a schematic illustration of a display of one embodiment of the invention using a polarizing beam splitter.

Referring now to the drawings, wherein like reference numerals designate identical or corresponding parts throughout the several views, FIG. 2A is a schematic illustration of a monocular polarized head-mounted projective display 30. In particular, the monocular p-HMPD configuration shown in FIG. 2A is a configuration in which the non-polarizing beam splitter 24 of FIG. 1 is replaced with a polarizing beam splitter (PBS) 44. The polarization states are shown on FIG. 2A. In FIG. 2A, a polarized image source 32 is projected with projection optics 34 by way of reflection of the polarized image from the polarizing beam splitter 44 onto retroreflective screen 36. Owing to the high reflectance of a polarizing beam splitter 44 for the S-polarization light, the projected light 38 is reflected with very high efficiency (e.g. about 93% for a wire-grid PBS to be discussed in more detail below), as opposed to about 50% or more loss through a non-PBS interface as shown in FIG. 1. In one embodiment of the invention, a high percentage (e.g., greater than 90%) of the image light is reflected by the polarizing beam splitter 44, which will later be redirected by retroreflective screen 36 toward the pupil 40.

In the display system of the invention, after the projected light 38 is reflected by the polarizing beam splitter 44, the projected light 38 is retroreflected back to polarizing beam splitter 44 by retroreflective screen 36. In this embodiment, the retroreflective screen provides a desirable low depolarization effect. Potential depolarization effects by the retroreflective screen were tested in development of the invention with an Axometric® polarimeter, and the results show that depolarization is less than 10% for incidence angles within ±20° and is less than 20% for angles up to ±30°. Further, the retroreflected light remains dominantly the same type of polarization as its incidence light. For instance, when the incident light is S-polarized, the retroreflected light remains S-polarized, perpendicular to the high-transmission polarization of the polarizing beam splitter 44. Depolarization artifacts can cause a decrease of luminance transfer efficiency varying with incidence angles. Such angular dependence of luminous efficiency visually creates vignetting-like artifacts and reduces image uniformity.

In order to minimize transmission loss in the invention, the polarization axis of the retroreflected light is closely matched with the P-polarization axis of polarizing beam splitter 44. The polarizing beam splitter 44 transmits P-polarization light. As shown in FIG. 2A, a quarter-wave retarder 48 (i.e., a polarization converter) can be inserted between of polarizing beam splitter 44 and retroreflective screen 36, with the quarter-wave retarder 48 having a fast axis (i.e., an axis along which the refractive index of the retarder is smaller and the light travels faster) at a 45-degree angle with the polarization direction of the light emergent from polarizing beam splitter 44. With this configuration, the projected light is manipulated through a consecutive sequence of polarization states, from its initial state of S-polarization after reflection at polarizing beam splitter 44 to right circular polarization (RCP) by the first pass of the quarter-wave retarder 48, from RCP to left circular polarization (LCP) at the interface of the retroreflective screen 36, and from LCP to P-polarization after the second pass of the retarder 48. One purpose for the polarization states manipulation is to minimize the transmission loss of the retroreflected light by the polarizing beam splitter 44. The quarter-wave retarder 48 rotates the polarization axis of the S-polarization light reflected by the polarizing beam splitter 44 into a P-polarization after the light is retroreflected back off the retroreflective screen 36 so that the polarization axis of the retroreflected light is closely matched with the P-polarization axis of polarizing beam splitter 44.

As a result, the projected light 38 is retroreflected back through the polarizing beam splitter 44 with high efficiency (i.e., with a high transmittance through the polarizing beam splitter 44 see below for details) to the exit pupil 40 of the projection system, where the eye is positioned to view the projected image 42 through beam splitter 44. The polarized display 30 of the invention permits stereoscopic capability, provides intrinsically correct occlusion of computer-generated objects by real ones, and offers the capability of designing wide FOV, low distortion optical see-through displays.

Due to the high transmittance of P-polarization light by polarizing beam splitter 44 (e.g. about 87% for a wire-grid beam splitter), the retroreflected light from retroreflective screen 36 is transmitted efficiently and is collected at the exit pupil, opposed to about 50% of transmission loss through a non-polarizing beam splitter interface. With the above modifications, Eq. (1) above for a p-HMPD can be rewritten as $$\Phi_v(\theta) = \alpha^2_{wp}(\theta) r_{P\text{-}trans}(\theta) r_{C\text{-}retro}(\theta) r_{S\text{-}refl}(\theta) \alpha_{eff}(\theta) \Phi_l \quad (\theta), \quad (2)$$

where $\alpha_{wp}$ is the transmittance of the wave-plate retarder, $r_{S\text{-}refl}$ and $r_{P\text{-}trans}$ are the reflection and transmission efficiencies of the PBS for S- and P-polarizations, respectively, and $r_{C\text{-}retro}$ is the retroreflectance of the retroreflective screen for circularly polarized light. The luminance transfer efficiency in a p-HMPD can be up to four times the efficiency in a non-polarizing HMPD designs using a theoretical 50/50 beamsplitting method. Practically, the observed image luminance is expected to about 15%~40% of the microdisplay luminance. In addition to FOV and wavelength dependence, the efficiency variation mainly depends on the retroreflectance of screen choices.

To increase image contrast and reduce the transmission loss of the light incident upon the polarizing beam splitter 44 from the projection optics 34, the light emitted by the image source 32 is in one embodiment linearly polarized, and its polarization direction is closely matched (e.g. aligned with less than a degree of difference) with the high-reflection polarization direction of the polarizing beam splitter 44, which is usually referred to as the S-polarization (See FIG. 2A). Variations from exact alignment will not make the display unusable, but rather will decrease the efficiency, brightness, and contrast of the display. In other words, slight misalignments, while reducing the efficiency of the display, do not invalidate the operational principle.

The image source 32 is in one embodiment a microdisplay. Microdisplays used in conventional HMD designs are usually liquid crystal (LC) type of flat panels, and thus the light emergent from these microdisplays is often linearly polarized. In most of the LC-based microdisplays, the polarization direction is usually parallel with the width or height side of the panel. Thus, as can be seen from the top-down view of FIG. 2A, light emerging from the S-polarized image source 32 has its polarization direction vertical. By aligning the polarizing beam splitter 44 such that its wire grids 44a are aligned along the projection optic axis 46, the S-polarized light will be directed to retroreflective screen 36. In other words, aligning the polarization direction of the panel with the S-polarization axis of the PBS can ensure high reflection of light. In one embodiment of the invention, it is also desirable to closely align the width of the panel with the horizontal FOV for a preferred aspect ratio of the visual field.

Figure 2B:
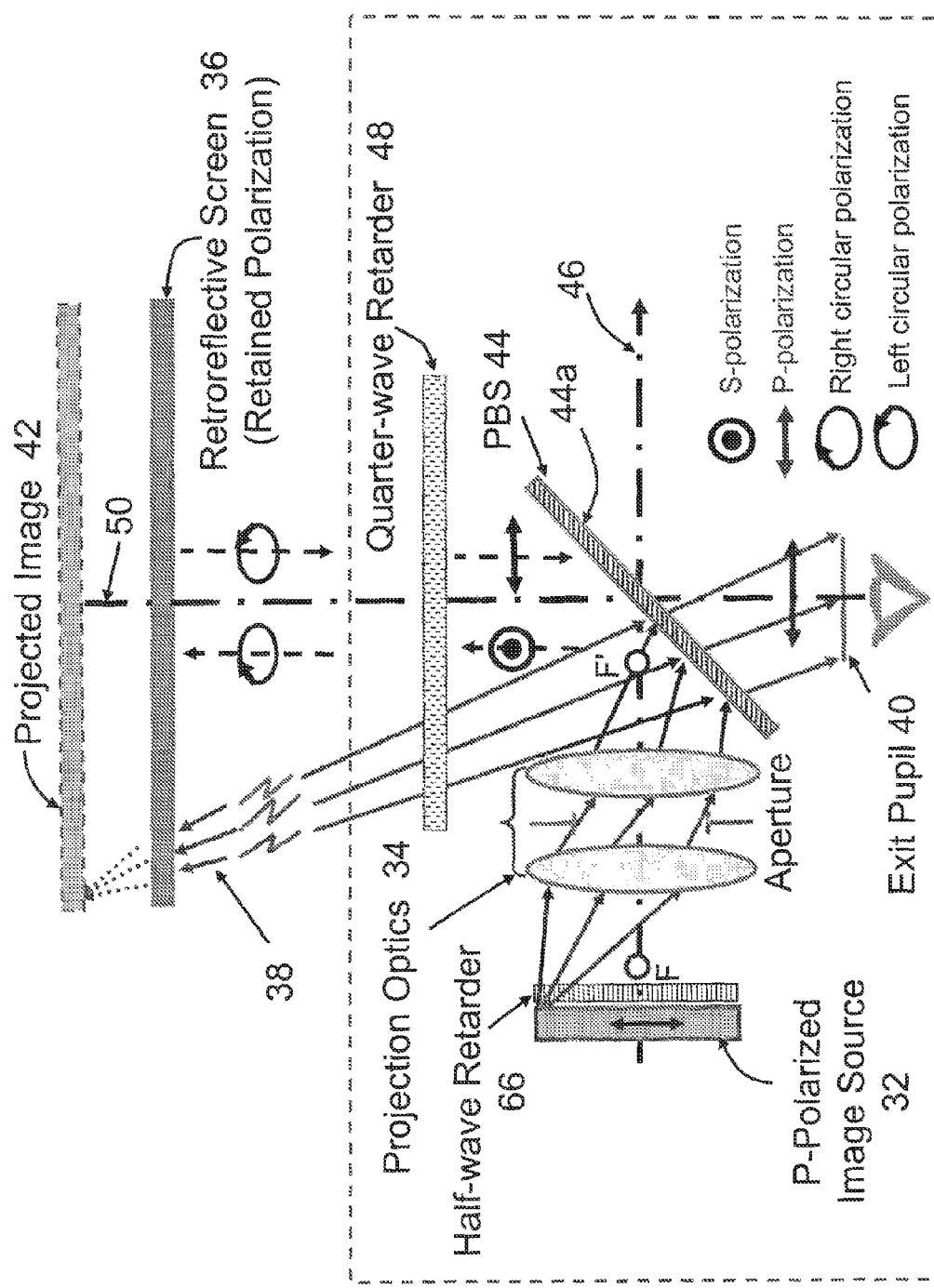
FIG. 2B is a schematic illustration of a display of another embodiment of the invention using a polarizing beam splitter with different polarization states.

In one embodiment, the microdisplay is placed so that its polarization axis is perpendicular to the S-polarization of the polarizing beam splitter 44. In this case, as shown in FIG. 2B, a half-wave plate retarder 66 is inserted in front of the polarizing beam splitter 44 or right after the microdisplay, with its fast-axis oriented at a 45-degree angle with the S-polarization, to rotate the polarization axis of the projected light by 90 degrees. The purpose of the retarder is to rotate the polarization axis of the light emitted by the image source by 90 degrees to be aligned with the polarizing beam splitter 44.

In microdisplays where their polarization direction is at an arbitrary angle with the S-polarization of the polarizing beam splitter 44, a polarization rotator 66a, replacing the half wave retarder 66 in FIG. 2B, can be designed to rotate the polarization axis of the projected light 38 accordingly. Except for a low-percentage absorption loss through a retarder or polarization rotator, the requirement for a linearly polarized projected light usually does not lead to significant loss of light using LC-based microdisplays due to the arbitrary polarization.

In some of the emerging microdisplays such as organic light emitting displays (OLED), rather than LC-based flat panels, the light emergent from these microdisplays is often unpolarized. In this case, the polarizing beam splitter 44 can directly split the projected light into S-polarization light and P-polarization light, where the S-polarized light is reflected by the polarizing beam splitter 44 and the P-polarization light is transmitted. When the retroreflective screen is positioned in 90-degrees with the horizontal optical axis 50 as shown in FIG. 2A, only the reflected light will be redirected toward the eye pupil. An optional polarizer (not shown for the sake of clarity) can be inserted at a position between the image source (e.g., the microdisplay panel) and the polarizing beam splitter 44 in order to increase the contrast of the projected image.

Figure 2C:
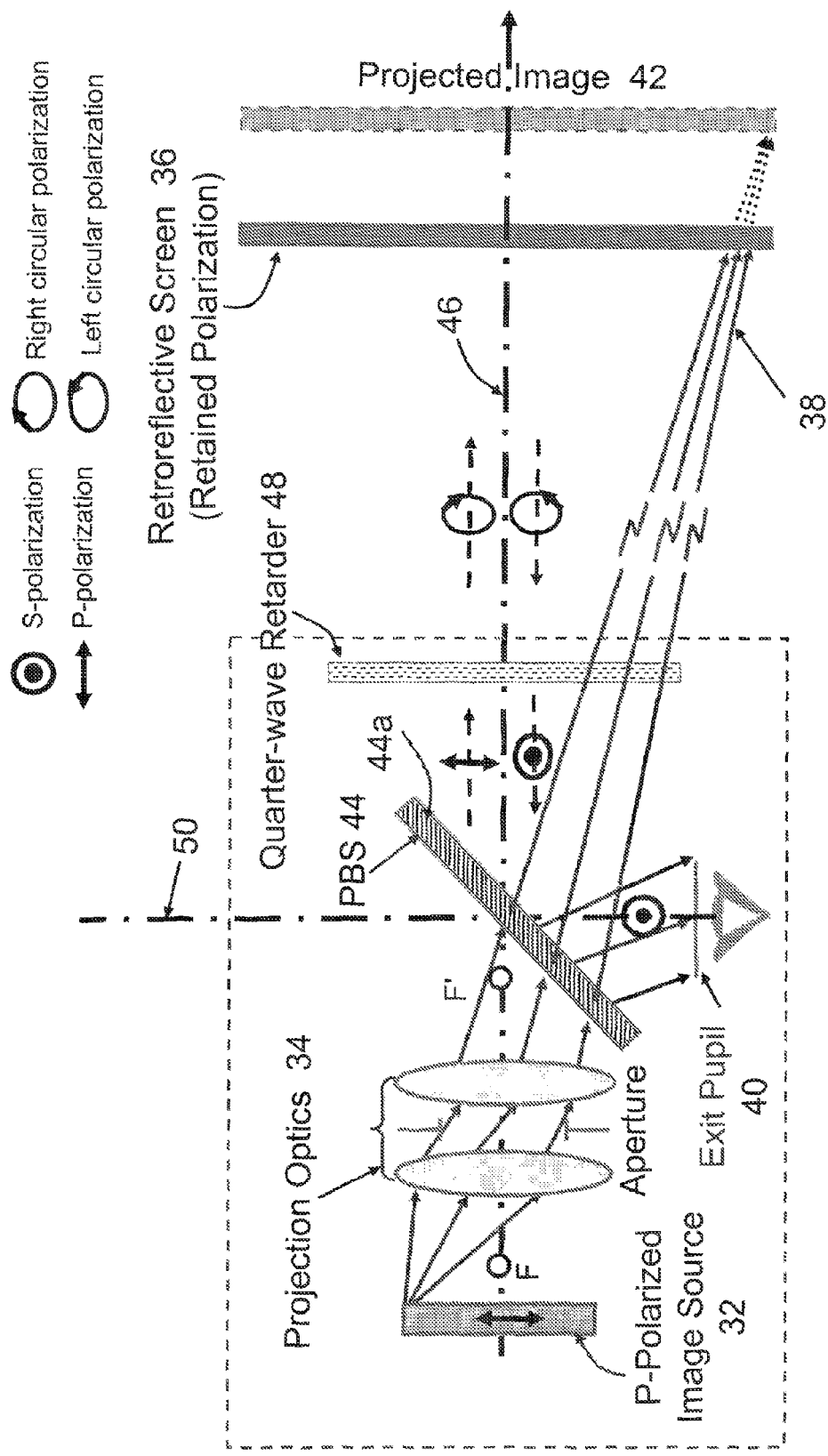
FIG. 2C is a schematic illustration of a display of another embodiment of the invention using a polarizing beam splitter and a different optical axis configuration.

In a different embodiment, the retroreflective screen and the retarder may be positioned along the horizontal optical axis as shown in FIG. 2C. In this case, the projected light from the projection optics (e.g., P-polarization light) will be firstly transmitted through the polarizing beam splitter 44 and then the retroreflected light is reflected by the polarizing beam splitter 44 back to the eye pupil. Here the polarization axis of the image source needs to be closely matched with the P-polarization direction, instead of the S-polarization in the other embodiments.

In one embodiment of the invention, an unpolarized image source is used, and the configurations of FIGS. 2A and 2C are combined where there would be a wave retarder/reflective screen pair on both axes 46 and 50.

Design of a Compact Optical System

System Specifications

A pair of existing 1.3" backlit color active matrix liquid crystal displays (AMLCD), with a resolution of (640*3)*480 pixels and a 42-μm pixel size, was selected as the miniature displays. The miniature displays may be replaced with other microdisplay technologies such as organic light emitting diodes (OLEDS), Liquid Crystal on Silicon (LCOS), or Ferroelectric Liquid Crystal on Silicon (FLCOS) with similar specifications. These displays are linearly polarized and have their polarization axes aligned with a width of a panel supporting the display. We aim to design a p-HMPD display system with a diagonal full FOV between 50 and 60 degrees, which corresponds to 35.3-28.6 mm of focal length for the projection lens used, but other displays with differing FOV and focal lengths can be used in the invention. FOV considerations include accounting for the behavior of retroreflective materials which shows that the retroreflectance of currently available materials drops off significantly for light incident at angles beyond ±35°. A FOV beyond 70 degrees could cause vignetting-like artifacts and compromise image uniformity. Moreover, increasing the FOV can degrade the angular resolution of the display.

The miniature display selected above only allows a narrow (i.e., 13 degrees) FOV to meet the requirement for 1-arc minute visual acuity at the fovea, while a 60-degree diagonal FOV offers a balanced angular resolution of 4.5 arc minutes per pixel. Finally, a wide FOV requires beam splitters and retarders with large dimensions, which consequently can compromise the compactness and lightweight of the display system. The back focal length (BFL) of the projection optics 34 in one embodiment is at least 25 mm due to the packaging considerations of the helmet design discussed in more detail below.

A diameter of exit pupil 40 is 10-12 mm, which leads to a projection system with a F/# of 2.5-3.5. The large pupil size allows a swivel of about ±21 up to 26.5° within the eye sockets without causing vignetting or loss of image with a typical 3-mm eye pupil in the lighting conditions provided by HMPDs. Furthermore, the large pupil size tolerates about 7 to 9 mm differences of the interpupilary distances (IPD) among different users without the need to mechanically adjust the IPD of the binocular optics.

In one embodiment of the invention, an effective eye clearance of 23 mm is necessary to accommodate users wearing eyeglasses. Though it may be less challenging to achieve large eye clearance in HMPD designs than in eyepiece-based HMDs, it can be problematic when the FOV is large. In a HMPD design of the invention, the exit pupil of the system is the mirror image of the entrance pupil of the projection optics. On one hand, if the separation between the entrance pupil of the projection optics and the beam splitter is not sufficient, the reflected light by the beam splitter at large field angles may be blocked by the projection optics. On the other hand, the required dimensions of the beam splitters and retarders scale with the FOV and the eye clearance distance. For compactness, the entrance pupil distance of the projection optics is optimized to be about 5~10 mm inside the lens. System specifications are given in Table I of FIG. 2D.

Design of Projection Optics

A five-element F/2.0 lens system with a full FOV of 70 degrees (similar to the lens system described in U.S. Pat. No. 2,799,207) was selected as a starting point for the design of the projection optics of the invention. The entire contents of U.S. Pat. No. 2,799,207 are incorporated herein by reference. The lens system in U.S. Pat. No. 2,799,207 contained at least four members of which at least two are collective and at least two are dispersive, the latter including a diaphragm (constituting the fifth element) between them and in which the two surfaces having the strongest collective power and border on air are arranged on opposite sides of the diaphragm and turn their concave surfaces towards it. A lens system of this type using five elements was scaled into a F/3.2 projection system with 56-degree FOV, which offers a good balance between display quality and helmet compactness and was utilized in one embodiment of the invention. The projection lens in this F/3.2 projection system had a 31.5-mm focal length and a 10-mm entrance pupil.

In another configuration, the five-element F/3.2 system of the first lens system embodiment described above was optimized. During the optimization, all the curvatures of the refractive surfaces and the thickness between the surfaces were set as variables. The surface materials were also set as variables, but were constrained to eliminate high-refraction index materials. Five visual fields, 0, 0.28, 0.55, 0.76, and 1 (i.e. on axis, 8, 16, 22, and 28 degrees, respectively) were optimized. The weights for the five fields were adjusted accordingly during the optimization process. This optimized 5-element system shown in FIG. 3A, offering a circular FOV of 58 degrees for a full unvignetted 10-mm pupil was derived. The optimized system demonstrates 30% of modulation contrast at a spatial frequency of 40 lines/mm. The optimized system has a spot size less than ¼ of the pixel size for the on-axis field and approximately ½ of the pixel size for the maximum field. Both modulation transfer function (MTF) and spot size performances are significantly better than the minimal requirements listed in Table 1 (see FIG. 2D). MTF is a measure of the ability of a lens system to evenly transmit an image consisting of a series of contrasting lines (such as for example black and white lines). The system detailed in Table 1 has about 13% of distortion, and a fairly large field curvature, which is not desirable in some display designs. The overall length of the optics itself was about 42 mm, with a back focal length of 41 mm. The diameter of the largest lens element is over 35 mm.

Figure 3A:
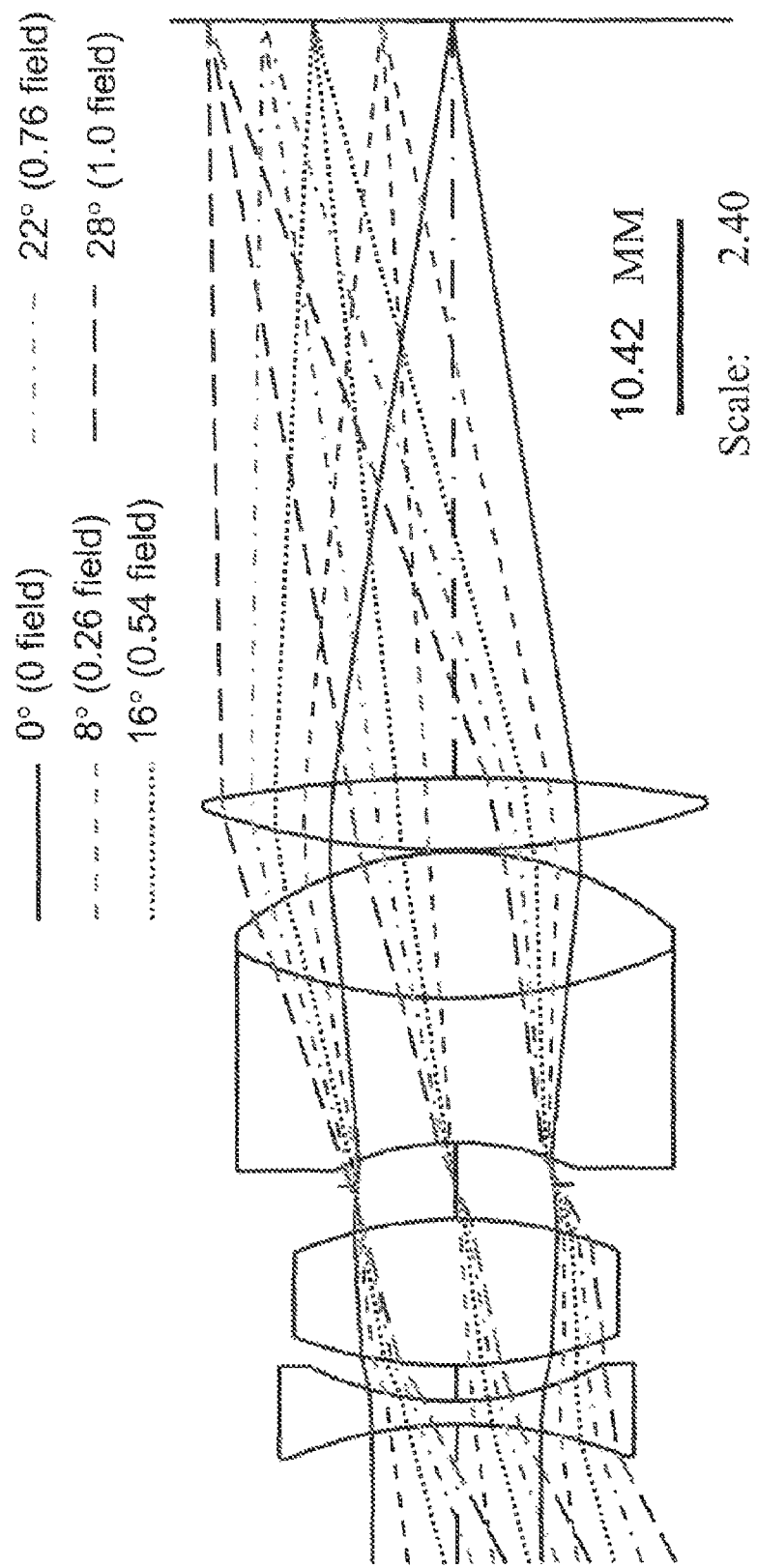
FIGS. 3A, 3B, and 3C are design layouts of the projection optics for a p-HMPD display of the invention.

For further optimization, the cemented doublet in FIG. 3A was replaced by a biconcave negative singlet with the same equivalent optical power. Several iterations of optimization led to a 4-element starting point, from which a global optimization process was performed. During the global optimization process, the major constraints were the effective focal length, overall length, as well as general constraints on the minimum and maximum thickness of the elements.

Figure 3B:
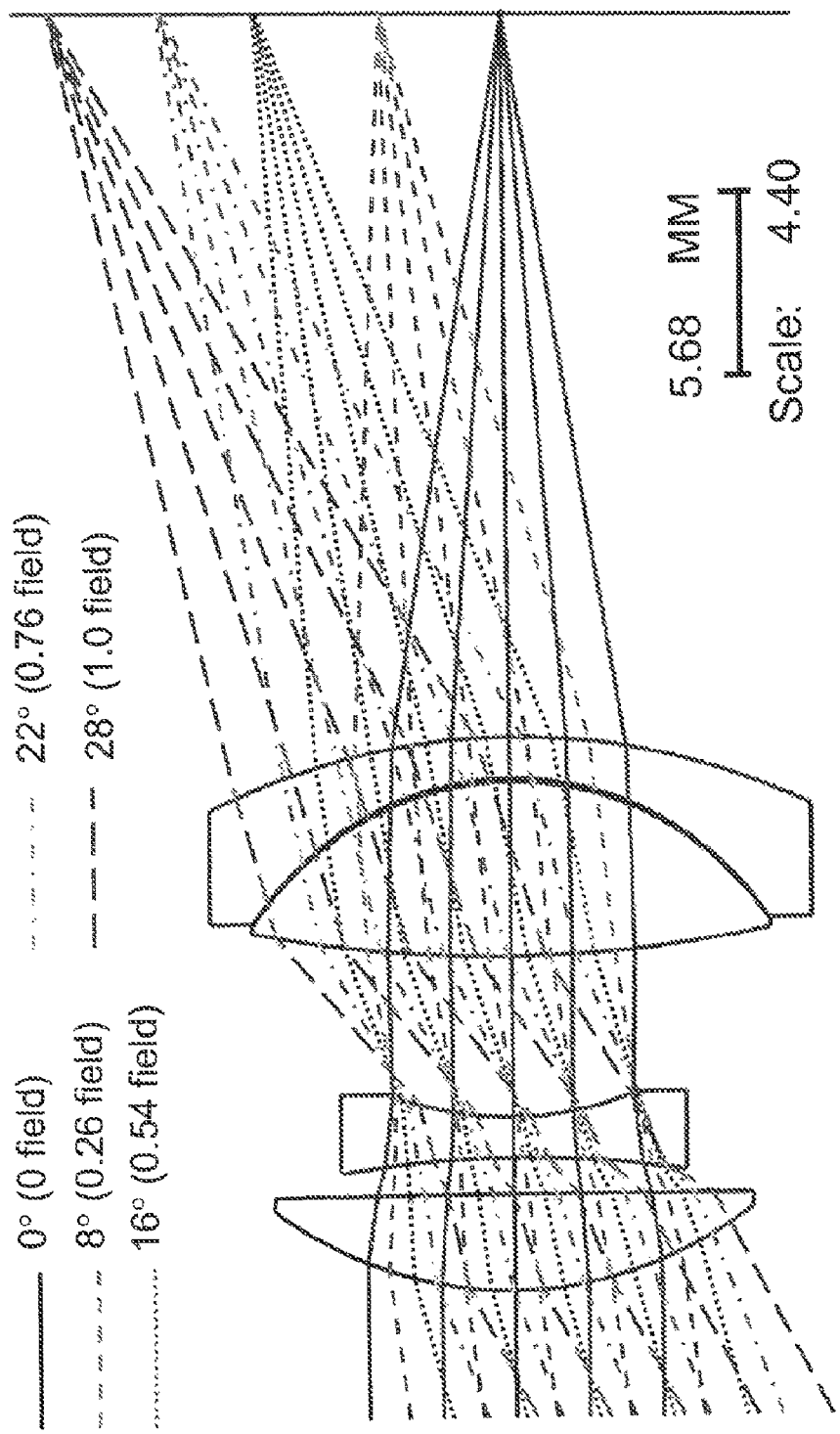

The format shown in FIG. 3B was selected for further optimization, mainly due to the combination of its lens shapes, compactness, and relatively low value of error function. Further optimization was performed progressively by adjusting the weights to the five visual fields to achieve approximately the same MTF performance across the FOV, in addition to the constraints on the overall length of the lens assembly and the back focal distance. The glass map was constrained so that high-refraction index materials could be avoided. After reaching a well-balanced optical performance and compactness, the fictitious materials were replaced with closely matched low-cost glasses.

Figure 3C:
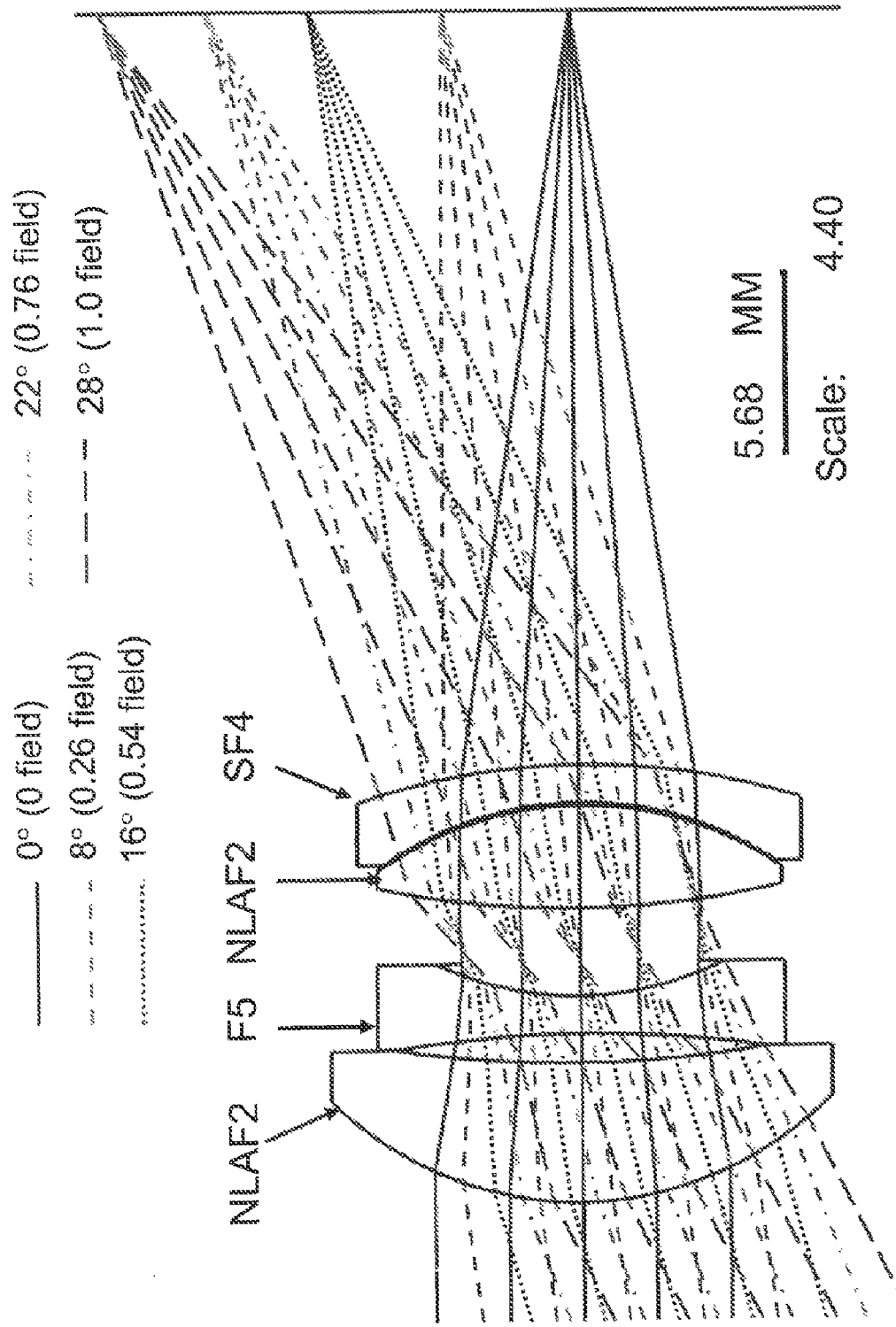

During the final stage of optimization, a constraint was added to ensure the back focal length to be at least 25 mm, and limit the third-order distortion, which was less corrected than other third-order aberrations. The system distortion was reduced to 3.8% at the 28-degree field. The layout of the finalized design, with a total weight of 6 grams, is shown in FIG. 3C.

It should be noted that the above-detailed "optimization" process is provided here not to restrict the invention, but rather to provide one context for the design of other optical projection systems suitable for use in the displays of the invention.

Further, in development of the invention, it has been found that the tele-centric requirement can be relaxed to gain compactness. Tele-centric refers to the parallelism of the chief rays with the optical system in the image space. If one compares both FIGS. 3B and 3C, the rays are much steeper in FIG. 3B than those in FIG. 3A. In the display space, the chief ray angle of the 1.0 field in FIG. 3C is about 32 degrees. Such a steep incident angle at the marginal field can potentially reduce image uniformity for LC-based displays, yielding vignetting-like artifacts, and compromise the image contrast of the peripheral field. However, enforcing tele-centric constraint would require that the lens aperture be at least the same size as the microdisplay source, which could significantly compromise the compactness of an HMD design. AMLCD microdisplays offer considerable larger viewing angles. The luminance and contrast attenuation within ±30 degrees of viewing angles appears to be acceptable. 20% non-uniformity across the entire visual field is not unusual in desktop displays.

Figure 4A:
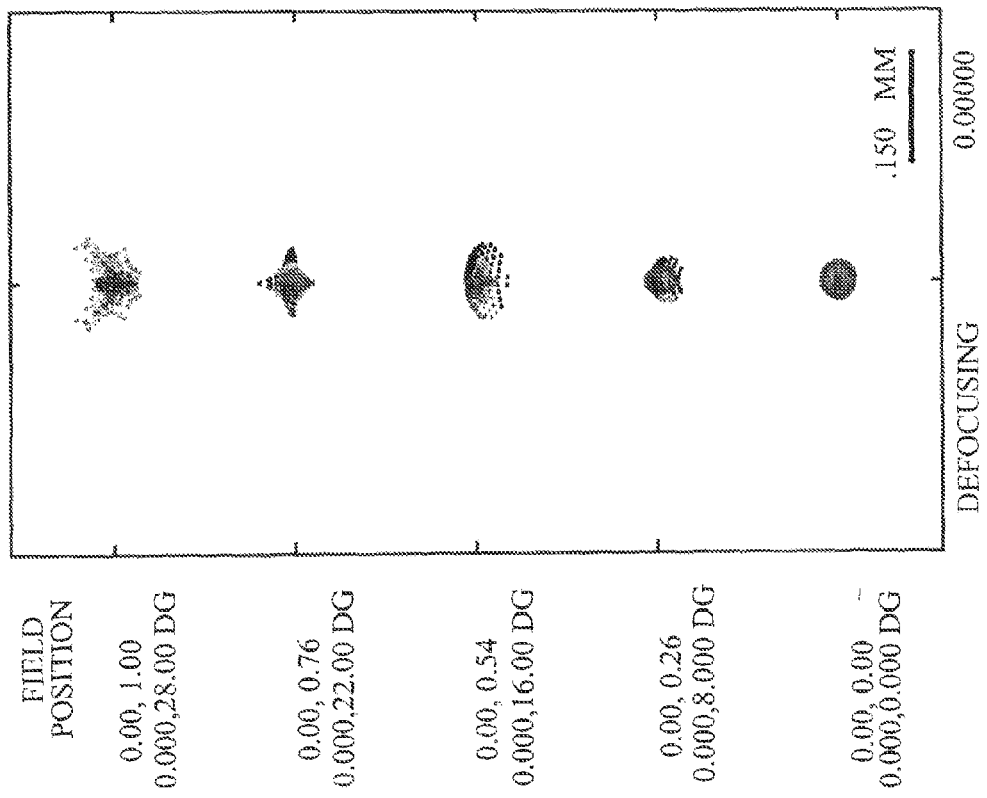
FIG. 4A is a spot diagram across five field angles for a 10-mm unvignetted pupil of FIG. 3C.
Figure 4B:
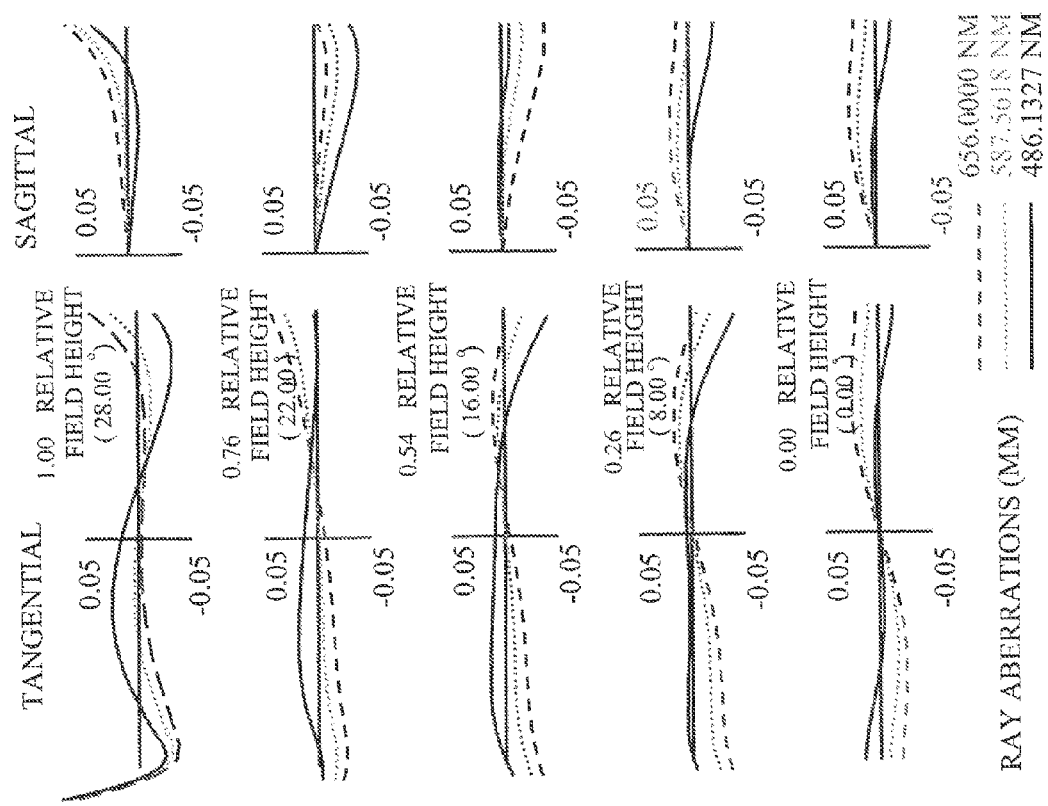
FIG. 4B is a series of rayfan plots for a 10-mm unvignetted pupil of FIG. 3C.
Figure 4C:
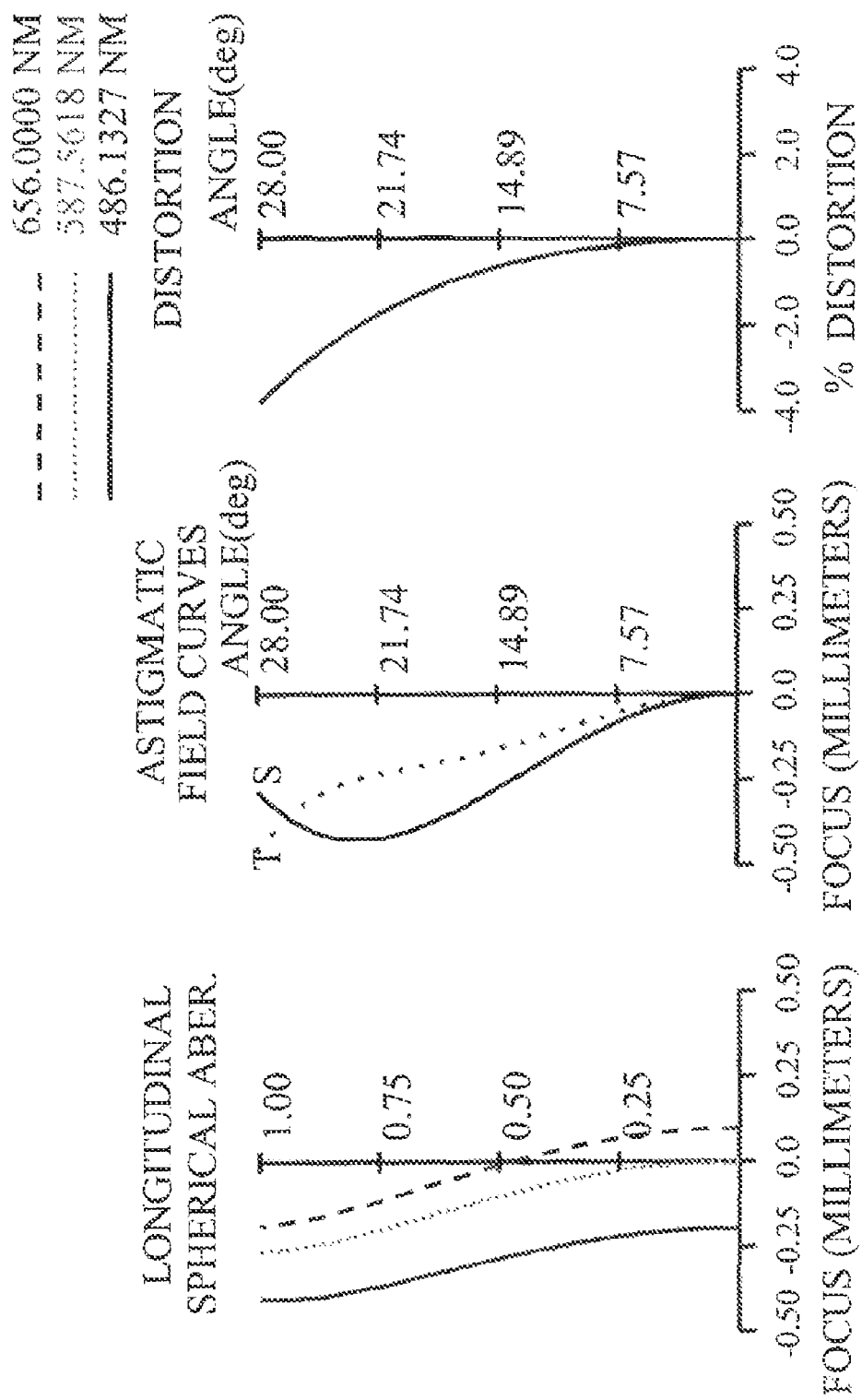
FIG. 4C is a series of plots for spherical aberration, astigmatism, and distortion plots for a 10-mm unvignetted pupil of FIG. 3C.
Figure 4D:
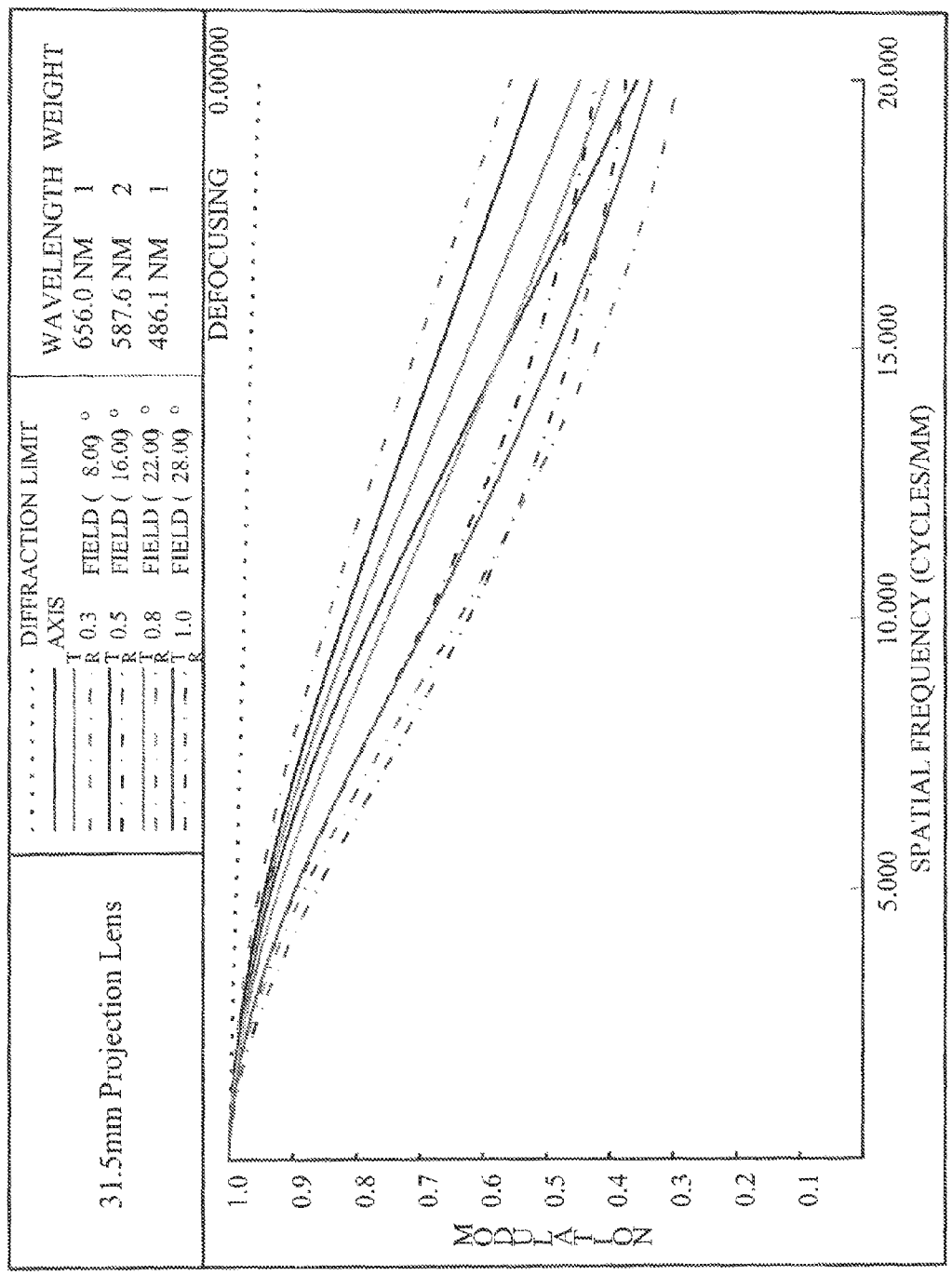
FIG. 4D is a graphical depiction of a polychromatic MTF as a function of the spatial frequency in line pairs per millimeter (cycles/mm)

The spot diagrams across the five fields are shown in FIG. 4A. The RMS spot diameter is smaller than the pixel size of the LCD display across the entire visual field. The rayfan plots and field curves are shown in FIG. 4B and FIG. 4C, respectively. The residual astigmatism reaches a maximum of 0.25 mm at the 21-deg FOV, and there is some residual coma at the 28-degree field. The distortion of the system is well corrected and less than 3.8% across the overall FOV. The polychromatic MTF for the full 10-mm pupil across the five representative field angles is shown in FIG. 4D. The modulation contrast of the design across the entire visual field is about 30% at a spatial frequency of 20 line pairs/mm, and over 50% at 12.5 line pairs/mm that is the spatial frequency of the targeted LCDs (see Table 1 in FIG. 2D).

Polarizing Components

One of the factors for consideration with regard to the polarizing components (i.e. the beam splitters and retarders) are their spectral responses to visible wavelengths, which result in color temperature displacements of the display system. The polarizing beam splitter and retarder can have a wide acceptance angle to match the FOV of the projection optics. Finally, the form factor and weight of these components are considerations for display compactness and portability.

Details about suitable polarizing beam splitters are given below with reference to a wire-grid polarizing beam splitter. One suitable wire-grid polarizing beam splitter is described in U.S. Pat. No. 6,243,199 (whose entire contents are incorporated herein by reference). Such wire-grid polarizing beam splitters are commercially available from Moxteck Inc. In one embodiment of the invention, a 65×45 mm nanometer-scale wire-grid plate polarizing beam splitter was utilized, with a plate thickness of 1.6 mm. The wire direction of the polarizing beam splitters is aligned with the width of the plate to match with the polarization axis of the microdisplay to maximize efficiency.

In general, a wire-grid polarizing beam splitter offers many advantages such as wide acceptance angles, low light absorption, light weight and plate form, broadband, and potentially low cost due to IC-type fabrication processes. Moreover, a wire-grid coating can be viewed as functioning as a dielectric interface for the P-polarization, but as a metal surface for the S-polarization. Consequently, a wire-grid polarizing beam splitter usually has high contrast ratio for S-polarization and lower contrast for P-polarization.

In other embodiment of the invention, the wire-grid technology is replaced with other alternative polarizing beam splitter technologies, such as a dichroic cube PBS and a multilayer birefringent cube PBS. A dichroic beamsplitter includes two glass prisms, each having an isosceles right triangular cross section, with a multilayer dielectric coating sandwiched therebetween. Cube beam splitters are typically made by coating the hypotenuse of a right angle prism and then cementing it to the hypotenuse of another right angle prism. In a multilayer birefringent cube PBS, a multi-layer film for the coating functions as a polarizer and contains at least two different materials, at least one of which exhibits birefringence after uniaxial orientation.

Details about suitable quarter-wave and half-wave retarders are given below. Suitable retarders are commercially available through Melles Griot. Alternatively, a retarder made of polymer may also be used with the same function. Polymer-based retarders are commercially available through Bolder Vision Optik or Meadowlark Optics. In one embodiment of the invention, a 60×45 mm glass-mica-glass cemented quarter-wave retarder was utilized. The fast axis of the retarder is at a 45-degree angle with the width of the component which matches with the polarization axis of the microdisplay. When the retarder is used together with the polarizing beam splitter, the retarder manipulates an incident linear polarization into a circular polarization and vice versa.

Design of a Compact Head Mounted Display

Lightweight and compactness are desirable for head-mounted devices. In order to avoid a front-heavy design, in one embodiment of the invention, the optical path of the projection optics was folded 90-degrees by inserting a mirror between the projection optics and the microdisplay. Such a design is shown in FIG. 5A.

Figure 5A:
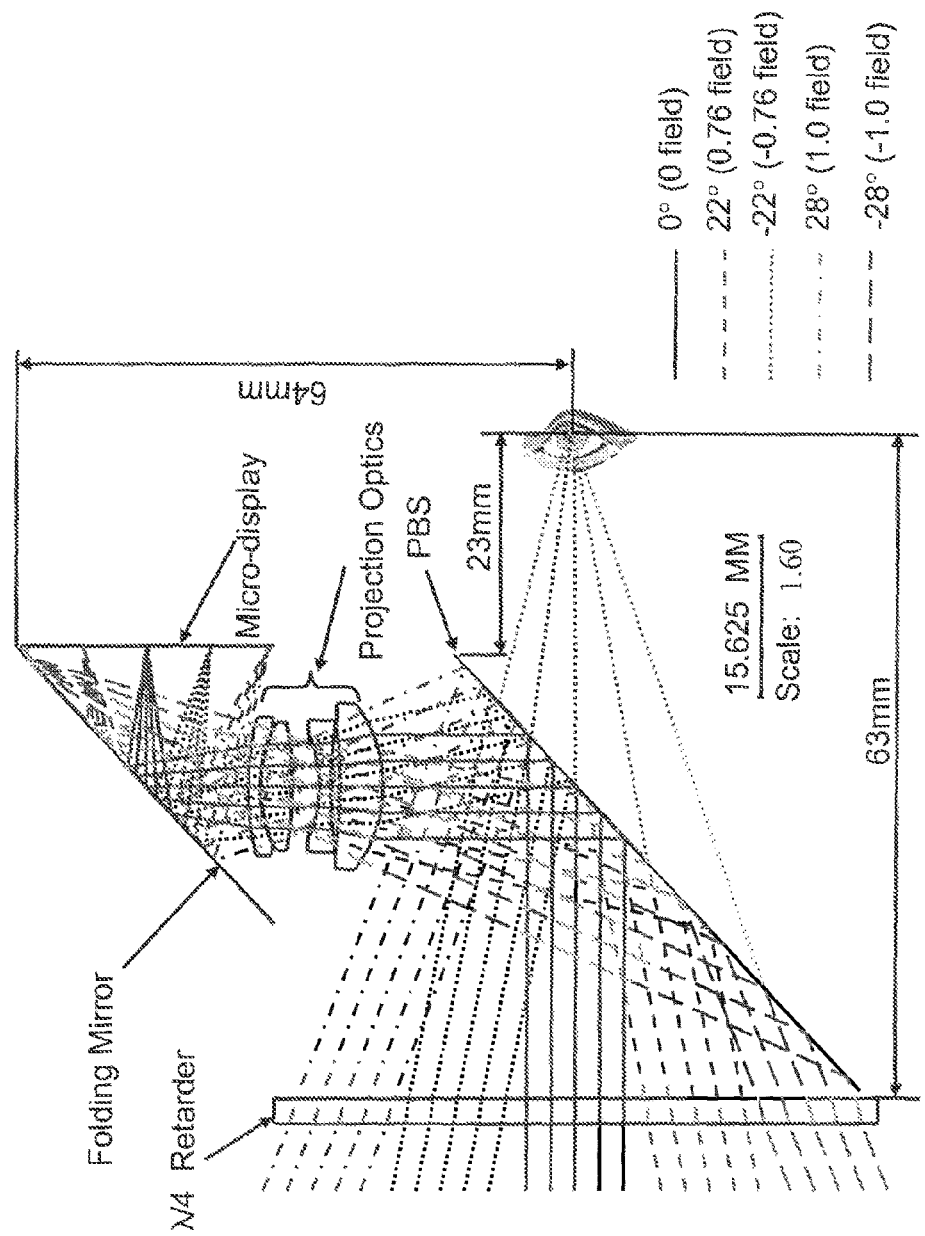
FIG. 5A is an optical layout of a compact p-HMPD display of the invention.

Specifically, FIG. 5A is an optical layout of a compact p-HMPD display of the invention. This folded configuration allows the installation of the microdisplay, the associated electronics, and cables to the sides of the helmet. The folded design also contributes to the reduction of the horizontal width of the helmet and satisfies both ergonomic and aesthetic considerations. As a result, the overall width of the helmet is in proportion to the average size of an adult head, and the overall weight is balanced around the head.

The total weight of the p-HMPD system of the invention shown in FIG. 5A is about 750 grams. A significant portion of the weight is attributed to complex metallic opto-mechanical structures within the helmet, which houses the optics and provides adequate adjustments of display focusing, alignment, and interpupillary distance (IPD). To minimize the weight, in one embodiment of the p-HMPD system of the invention, non-metallic opto-mechanical structures were used.

Figure 5B:
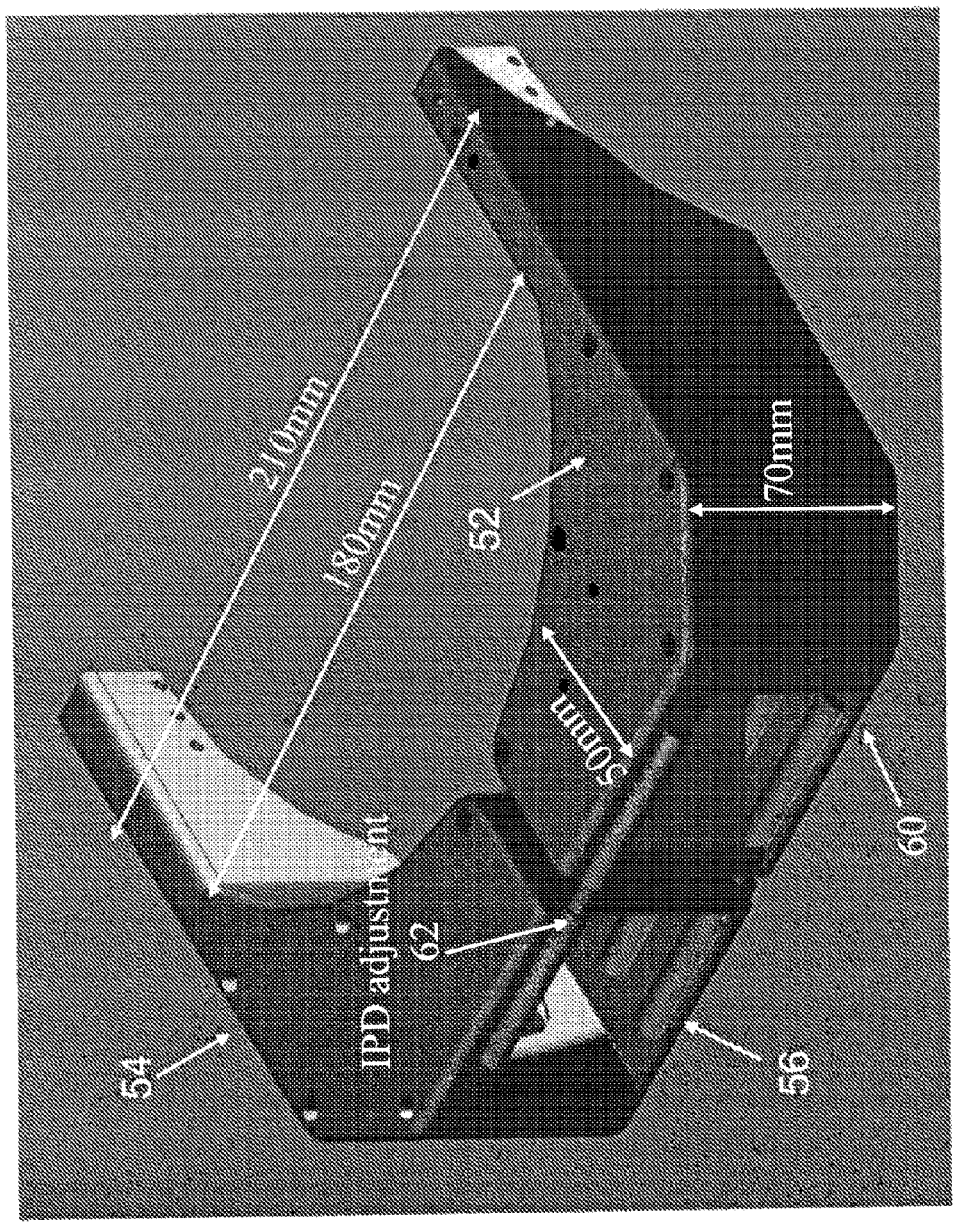
FIG. 5B is a schematic depiction of an assembly of a helmet for the compact p-HMPD display of the invention.

FIG. 5B is a schematic depiction of a computer-aided-design assembly of a helmet for the compact p-HMPD display of the invention. Considering the free-form fabrication capability of Rapid Prototyping (RP) techniques, also known as Layered Manufacturing, a helmet shell was shaped in such a way that the necessary structures supporting the optics and electronics were integrated with the shell as one single piece. The main shell provides various shaped structures to mount the mirror, microdisplay, electronics, projection optics, PBS and waveplate retarder in alignment. These structures were designed as an integrated piece, and the positioning of these optical elements was ensured by the accuracy of fabrication, and fine positioning was warranted by spacing adjustment during the assembly of helmet.

To allow the adjustment of the interpupillary distance, the housings for the left and right arms 54 and 56 of optics were designed as symmetric but separate parts. The parts were connected together by two rods. By pulling or pushing the two parts, the interpupillary distance can be adjusted appropriately when necessary. This simple method eliminated the complex mechanism used in the previous design.

The left part 52 and the right part 54 are identical, each of which consists of a main shell 56 with the supporting structures 58 and a cover piece 60. The IPD adjustment 62 is shown centered. The sides of the main shell were shaped to hold and guide the thick and long video cables that run from the microdisplays to a computer system (not shown in FIG. 5B). The helmet shell 56 was assembled and attached to an off-the-shelf head band that offers head-size adjustment. The total weight was about 450 grams.

EXAMPLES

The fabricated wire-grid polarizing beam splitters and retarders were tested for FOV dependence with an Axiometric polarimeter at a 550 nm wavelength. The reflectance for S-polarized light is approximately 93% for zero-degree field angle, varying between 88% and 96% for field angles in the range of ±30°. The transmittance for P-polarized light is approximately 87% for zero-degree field angle, varying between 82% and 60% for field angles in the range of ±30°.

The zero-degree field corresponds to a 45-degree incidence angle on the PBS, and a positive field angle indicates that a ray impinges on the PBS at an angle less than 45 degrees. At the zero-degree field, the ratio of the reflectance for S-polarized light to P-polarized light is about 95, and the ratio of the transmittance for P-polarized light to S-polarized light is about 480.

The transmittance of the retarder in this embodiment was approximately constant across the entire FOV (less than 1.5% of variation). The retardance magnitude remained approximately constant up to about ±16° FOV and increases gradually by 40 nm (about 7% of the testing wavelength) at ±30° FOV. The FOV dependence of the retardance magnitude will cause a reduction of the overall efficiency at marginal visual field of the display, creating vignetting-like artifacts.

To validate these improvements on image brightness, two monocular displays were implemented on an optical bench for the convenience of testing flux efficiency: one display based on the polarizing design of the invention and the other display without polarization manipulation using a conventional 50/50 non-polarizing beam splitter. The projection lenses used in the demonstration displays, with an effective focal length of 30 mm, were assembled from two off-the-shelf achromats.

Using a calibrated, collimated light source, the luminance efficiency of the two displays were quantified over ±30° of FOV. The results demonstrated approximately four times a consistent improvement on luminance efficiency, across the entire FOV. Combining the efficiencies of the projection optics, polarizing beam splitter, the retarder, and the retroreflective film, the overall efficiency of the polarized setup is about 17% at the center field, and slowly drops down to about 12% at ±30° fields. On the contrary, the overall efficiency of the non-polarized setup is approximately 4% at the center, and drops down to about 2% at ±30°.

Figure 6A:
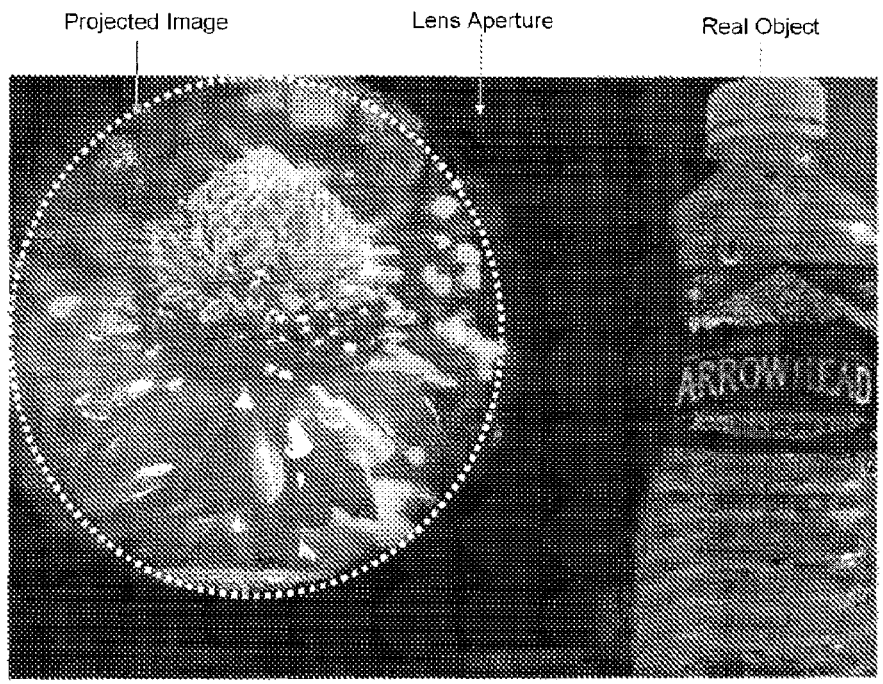
FIG. 6A is a photographic replication of an image from a polarized compact p-HMPD display of the invention.
Figure 6B:
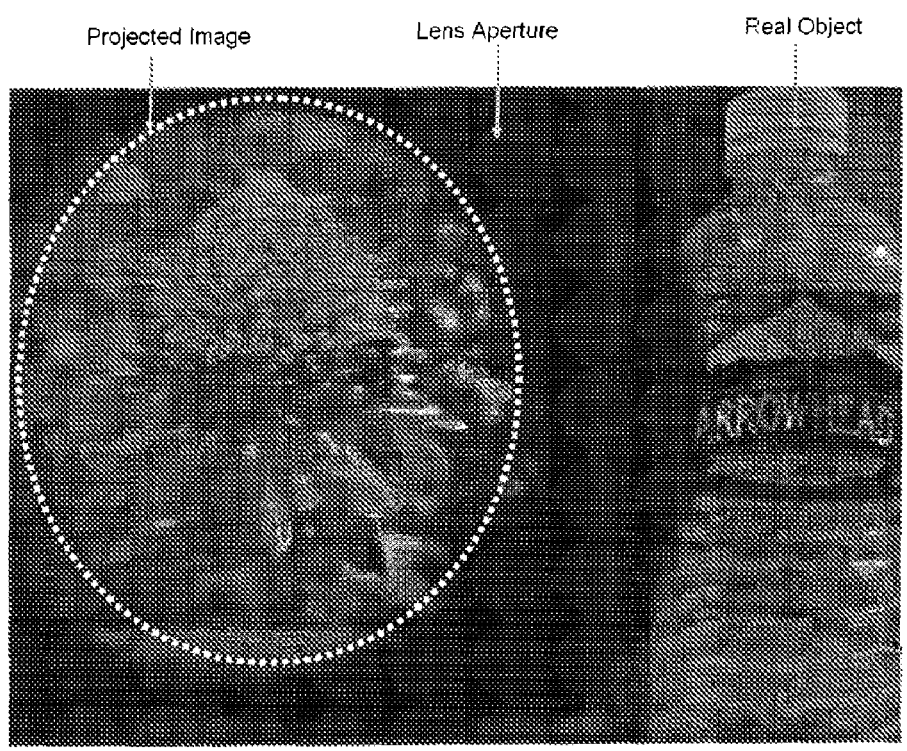
FIG. 6B is a photographic replication of an image from a non-polarized compact p-HMPD display of the invention.

To compare the image brightness and contrast of the two displays with and without polarization control, the collimated light source used in the previous testing was replaced with microdisplays, and an identical image was projected through the setups. Under identical room lighting conditions and camera exposure setting, a set of photographs were taking from the two bench prototypes by aligning the camera with the exit pupil of the optics. Two examples of the photographs under identical room lighting from the polarized display and the non-polarizing one are shown in FIGS. 6A and 6B, respectively. Neither post-processing nor brightness enhancement was performed on these photographs. The photographs from the polarized display demonstrated a considerable increase in intensity and significant improvement on image contrast and color vividness over those from the non-polarizing display.

Figure 6C:
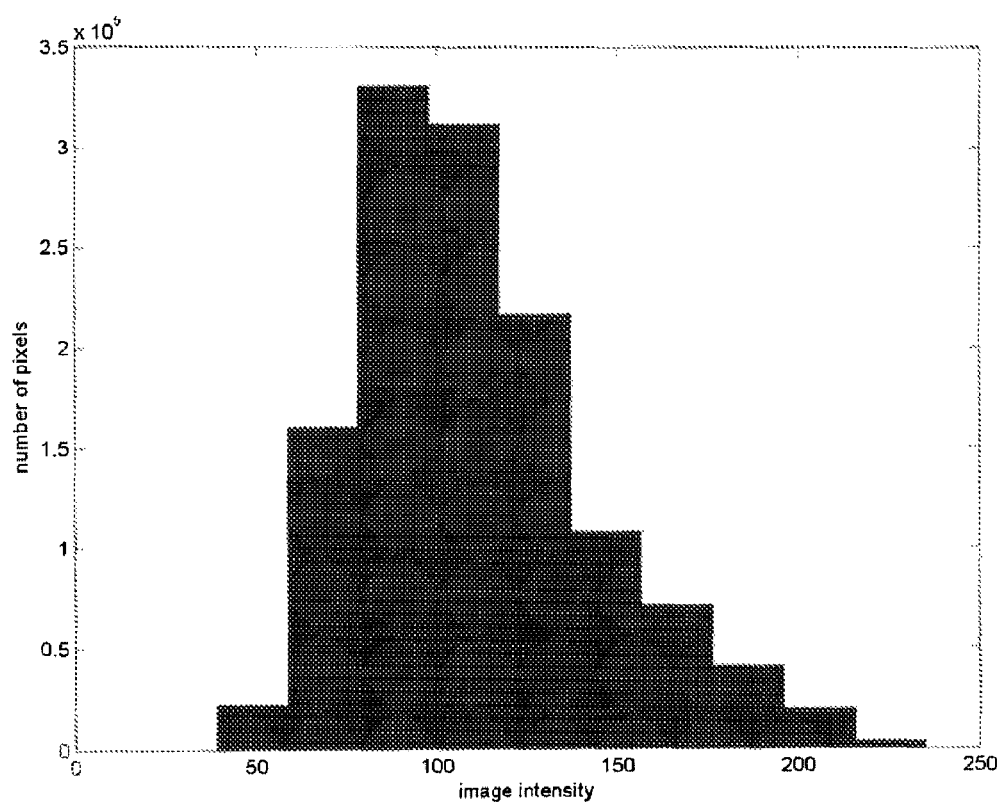
FIG. 6C is a histogram of the display view region in FIG. 6A.
Figure 6D:
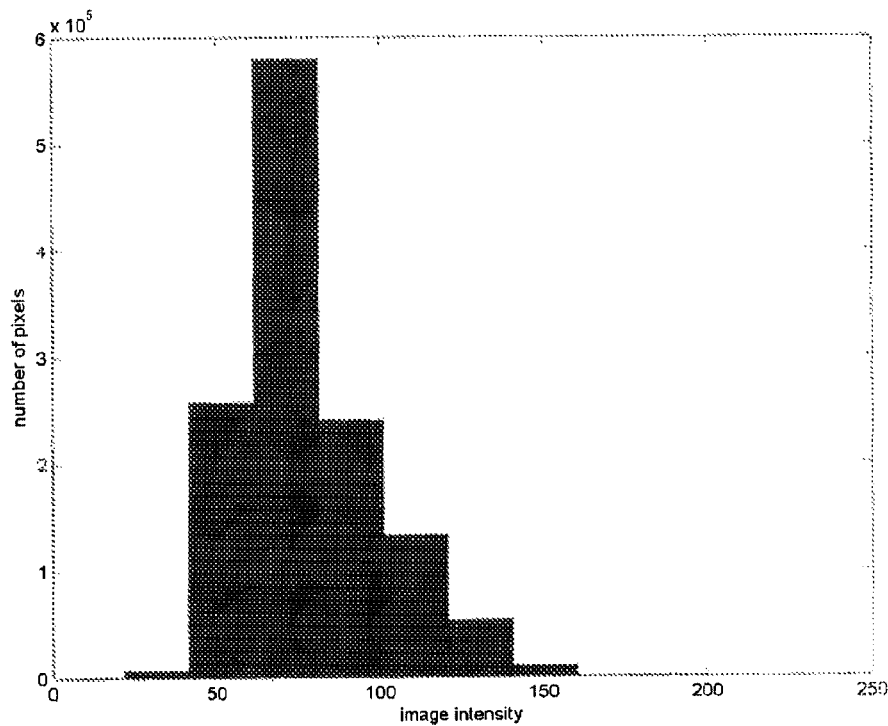
FIG. 6D is a histogram of the display view region in FIG. 6B.

From the photograph sets, histograms of the region representing the display view were analyzed, which is marked with dotted circular lines on the figure. The histograms for the two examples in FIGS. 6A and 6B are shown in FIGS. 6C and 6D, respectively. The mean intensity values increase by about 50%, from 78 for the non-polarizing display to 111 for the polarizing display, and the standard deviations increased by about 52%, from 21 to 33. Such wider intensity distribution for the polarizing display indicates an improvement on image contrast and dynamic range.

Image Displaying

Figure 7:
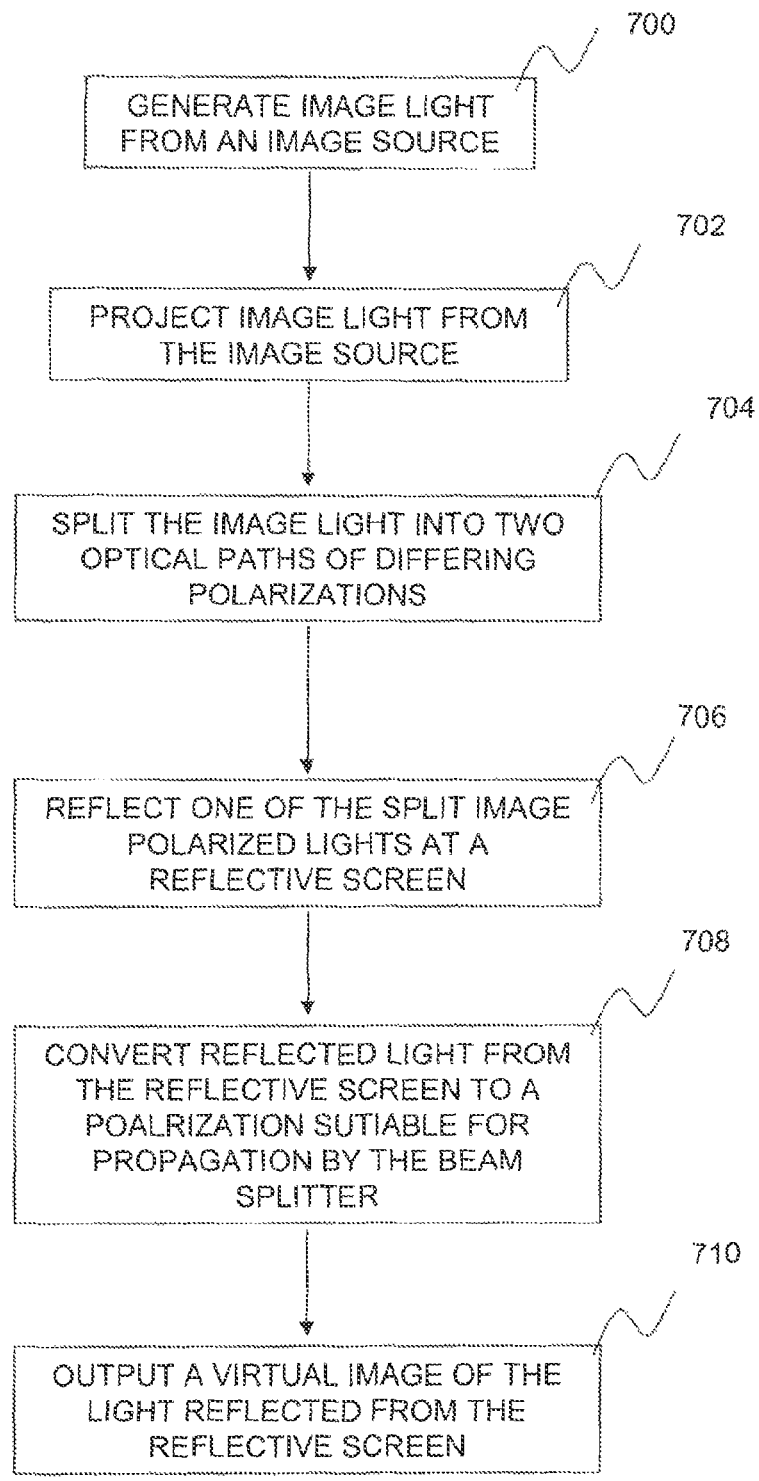
FIG. 7 is a flowchart of a method for image displaying according to an embodiment of the invention.

FIG. 7 is a flowchart of a method for image displaying according to an embodiment of the invention. While the elements of FIG. 7 have been labeled with descriptions of these elements, the following reference to the element numbers provides more detail. At 700, image light is generated from an image source. At 702, the image light is projected from the image source. At 704, the image light is split for example a beam splitter 44 splits first polarized light of the image light having a first polarization into a first optical path and second polarized light of the image light having a second polarization into a second optical path. At 706, the first polarized light in the first optical path is reflected as a virtual image of the image light being focused. At 708, the first polarized light is converted into the second polarized light (suitable for propagation by the beam splitter). At 701, the second polarized light is propagated by the beam splitter for viewing of the virtual image.

At 702, the image light generated can be polarized image light having a polarization aligned with one of the first or second polarizations. At 702, the image light generated can be generated directly as polarized image light and converted into at least one of the first or second polarizations (e.g., S-polarization or P-polarization). At 702, the image light generated can be generated from at least one of a liquid crystal display, a light emitting diode display, an organic light emitting diode display, liquid crystal on silicon display, and a ferroelectric liquid crystal on silicon display. At 702, the image light generated can be generated from a non-polarized image light and filtering the non-polarized image light by a polarizing element having a polarization axis aligned with one of the first and second polarizations. At 702, the image light generated can be generated and reflected to the beam splitter for example with a folded mirror.

At 704, the reflection and the transmission can be orthogonally polarized components of the image light. Moreover, the first polarization (e.g., a S-polarization) can be converted to a quarter wave circular polarization state prior to reflection at the reflective screen. Thereafter, the quarter wave circular polarization state can be converted to the second polarization (e.g., a P-polarization) prior to transmission through the beam splitter to the exit pupil. Otherwise, the quarter wave circular polarization state can be converted to the second polarization (e.g., a S-polarization) prior to reflection by the beam splitter to the exit pupil.

At 706, the image light spilt can be split by a beam splitter which extends across an entire FOV from the exit pupil. At 706, the beam splitter can be a polarizing beam splitter such as a wire-grid polarizer. At 708, a retroreflective screen can be used as the reflective screen. At 710, the viewing can be provided by video signals to generate the image source. At 710, the viewing can be after projecting the image light into a head mounted display.

In general, these image displaying functions can be performed in a system including specific ones of the components described in FIGS. 2A-2C and 5B. The system includes the following components (enumerated below by way of example): an image source 32 configured to generate image light, projection optics 34 configured to project the image light, a polarizing beam splitter 44 optically coupled to the projection optics 34 and configured to propagate into a first optical path first polarized light having a first polarization (e.g., S-polarization) and to propagate into a second optical path second polarized light having a second polarization (e.g., P-polarization). The system includes a quarter wave converter 48 disposed in the first optical path and configured to rotate the first polarization by a quarter phase as the first polarized light first passes through the quarter wave converter 48. The system includes a reflective screen 36 disposed in the first optical path and configured to reflect rotated first polarized light from the quarter wave converter 48 back through the quarter wave converter 48 for further quarter phase rotation, whereby image light of the rotated first polarized light is converted to converted image light of the second polarization.

Further, as shown in the drawings, converted image light of the second polarization is propagated in the first optical path back to the polarizing beam splitter for propagation by the polarizing beam splitter.

The system includes an output port 40 disposed in the first optical path and configured to receive the converted image light of the second polarization propagated by the beam splitter 44.

The polarizing beam splitter 44 can be configured to reflect the first polarized light onto the first path 50 and to transmit the second polarized light onto the second path 46. The polarization conversion optics as shown in FIG. 2B can include a quarter wave retarder 48 on one of the first and second optical paths to rotate a polarization of the image light.

In one embodiment, the reflective screen 36 is disposed at a position to receive light reflected from the beam splitter 44, the first polarization is S-polarized light and the second polarization is P-polarized light, and the quarter wave retarder 48 is configured to rotate the S-polarized light to become P-polarized light before transmission through the beam splitter 44 to the exit pupil 40. In another embodiment, the reflective screen 36 is disposed at a position to receive light transmitted through the beam splitter 44, the first polarization is S-polarized light and the second polarization is P-polarized light, and the quarter wave retarder 48 is configured to rotate the P-polarized light to become S-polarized light before reflection by the beam splitter 44 to the exit pupil 40. As shown in FIG. 2B, a half-wave retarder 66 can be disposed in an optical path between the polarized image source 32 and the beam splitter 44. The half-wave retarder 66 can rotate a polarization direction of the image light from the polarized image source 32 into at least one of the first or second polarizations (S-polarization or P-polarization) to be aligned with a polarization direction of the beam splitter 44.

The image source 32 can be a polarized image source aligned with one of the first or second polarizations (e.g., S-polarized or P-polarized). A shell 52 as shown in FIG. 5B can integrally mount the polarized image source in alignment with the polarizing beam splitter. As noted above, the image source 32 can be at least one of a liquid crystal display, a light emitting diode display, an organic light emitting diode display, liquid crystal on silicon display, and a ferroelectric liquid crystal on silicon display. Furthermore, the image source 32 can be made of a non-polarized image source and a polarizing element having a polarization axis aligned with one of the first and second polarizations of the beam splitter. In this case, the half-wave retarder 66 in FIG. 2B would be replaced with a polarizing filter.

In one embodiment, the beam splitter 44 is a wire-grid polarizer 9 as shown in FIGS. 2A-2C), has a wire direction (or pattern 44a) defining a P-polarization direction, and has an orthogonal direction to the wire direction defining for an S-polarization direction.

Figure 8:
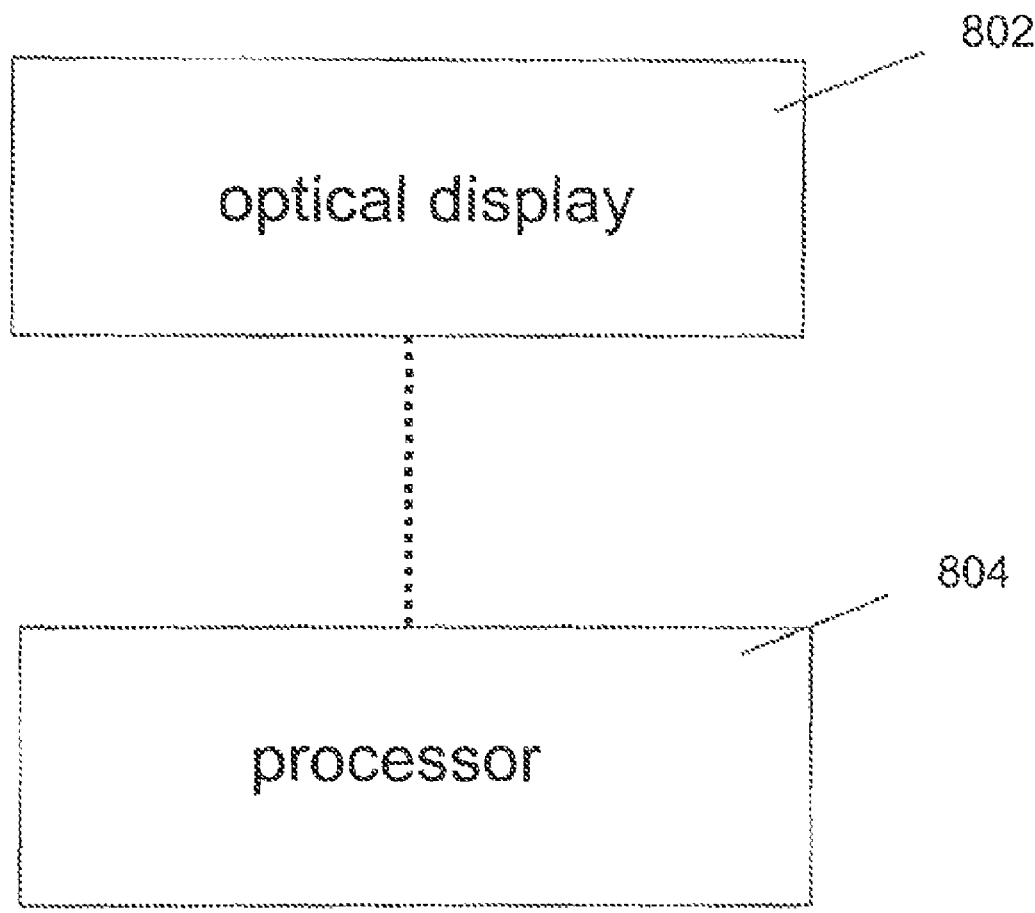
FIG. 8 is a schematic showing one embodiment of the invention where a processor is in communication with an optical display of the invention to provide video signal to the optical display.

In one embodiment, the projection optics, the polarizing beam splitter, the reflective screen, the polarization conversion optics, and the exit pupil are a part of a head mounted display as shown in FIG. 5B. FIG. 8 is a schematic showing one embodiment of the invention where a processor is in communication with an optical display of the invention (e.g., the head mounted display shown in FIG. 5B) to provide video signal to the optical display. In FIG. 8, optical display 802 can include or be connected to a processor 804 providing video signals to for example an image source 32 in an optical display 802.

The processor 804 can be programmed and/or configured to receive video feed information and configure the video feed to drive whatever type of image source is being used in the optical display 802. For example, the processor 804 can tailor its videos drive to whether the image source is one of a liquid crystal display, a light emitting diode display, an organic light emitting diode display, liquid crystal on silicon display, and a ferroelectric liquid crystal on silicon display. The processor 804 includes a bus or other communication mechanism for communicating information, and a internal processor coupled with the bus for processing the information. The processor 804 includes a memory, such as a random access memory (RAM) or other dynamic storage device (e.g., dynamic RAM (DRAM), static RAM (SRAM), and synchronous DRAM (SDRAM)), coupled to the bus for storing information and instructions to be executed. The processor 804 can includes a non-volatile memory such as for example a read only memory (ROM) or other static storage device (e.g., programmable ROM (PROM), erasable PROM (EPROM), and electrically erasable PROM (EEPROM)) coupled to the bus for storing static information and instructions for the internal processor.

The processor 804 may include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The processor 804 can include at least one computer readable medium or memory for holding instructions programmed and for containing data structures, tables, records, or other data necessary to drive the optical display 802. Examples of computer readable media suitable for the present invention are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to the optical display 802 for execution. The processor 804 also includes a communication interface to provides a data communication coupling to a network link that can be connected to, for example, a local area network (LAN), or to another communications network such as the Internet. Wireless links may also be implemented. In any such implementation, an appropriate communication interface can send and receive electrical, electromagnetic or optical signals that carry digital data streams representing various types of information (such as the video information) to the optical display 802.

Numerous modifications and variations of the present invention are possible in light of the above teachings. It is, therefore, to be understood that within the scope of the accompanying claims, the invention may be practiced otherwise than as specifically described herein.

The invention claimed is:
1. An image display system comprising:
an image source configured to generate image light;
projection optics configured to project and focus said image light;
a polarizing beam splitter optically coupled to the projection optics and configured to propagate, into a first optical path separate from the projection optics, first polarized light having a first polarization and to propagate, into a second optical path separate from the projection optics, second polarized light having a second polarization;

a quarter wave converter disposed in said first optical path and configured to rotate said first polarization by a quarter phase as said first polarized light first passes through said quarter wave converter;

a retro-reflective screen separate from the projection optics, disposed in said first optical path and configured to reflect rotated first polarized light from said quarter wave converter back on a same direction to said quarter wave converter as from said quarter wave converter through said quarter wave converter for further quarter phase rotation, whereby image light of the rotated first polarized light is converted to converted image light of the second polarization, said converted image light of the second polarization propagated in said first optical path back to the polarizing beam splitter for propagation by said polarizing beam splitter; and an output port disposed in said first optical path and configured to receive the converted image light of the second polarization propagated by the beam splitter.

2. The system of claim 1, wherein the polarizing beam splitter is configured to reflect said first polarized light onto the first optical path and to transmit said second polarized light onto the second optical path.

3. The system of claim 1, wherein the polarizing beam splitter is configured to transmit said first polarized light onto the first optical path and to reflect said second polarized light onto the second optical path.

4. The system of claim 1, wherein:
the retro-reflective screen is disposed at a position to receive light reflected from the beam splitter,
the first polarization is S-polarized light and the second polarization is P-polarized light, and
the quarter wave converter comprises a quarter wave retarder configured to rotate the S-polarized light to become said P-polarized light before transmission through the beam splitter to an exit pupil.

5. The system of claim 1, wherein:
the retro-reflective screen is disposed at a position to receive light transmitted through the beam splitter,
the first polarization is P-polarized light and the second polarization is S-polarized light, and
the quarter wave converter comprises a quarter wave retarder configured to rotate the P-polarized light to become said S-polarized light before reflection by the beam splitter to an exit pupil.

6. The system of claim 1, wherein the image source comprises a polarized image source aligned with one of the first and second polarizations.

7. The system of claim 6, further comprising:
a shell integrally mounting the polarized image source in alignment with the polarizing beam splitter.

8. The system of claim 6, further comprising:
a half-wave retarder disposed in an optical path between the polarized image source and the beam splitter, and configured to rotate a polarization direction of the image light from the polarized image source into at least one of the first or second polarizations to be aligned with a polarization direction of the beam splitter.

9. The system of claim 1, wherein the beam splitter comprises at least one of a wire-grid polarizer, a dichroic cube polarizing beam splitter, and a multilayer birefringent cube polarizing beam splitter.

10. The system of claim 1, wherein the image source comprises at least one of a liquid crystal display, a light emitting diode display, an organic light emitting diode display, liquid crystal on silicon display, and a ferroelectric liquid crystal on silicon display.

11. The system of claim 1, wherein:
the image source generates S-polarization image light; and
the beam splitter reflects the S-polarization image light and transmits the converted image light of the second polarization as P-polarization image light.

12. The system of claim 1, wherein:
the image source generates P-polarization image light; and
the beam splitter transmits the P-polarization image light and reflects the converted image light of the second polarization as S-polarization image light.

13. The system of claim 1, wherein the image source includes a folded mirror configured to reflect the image light to the projection optics.

14. The system of claim 1, further comprising:
a processor configured to provide video signals to said image source.

15. The system of claim 1, wherein the projection optics, the polarizing beam splitter, the retro-reflective screen, the quarter wave converter, and an exit pupil comprise a head mounted display.

16. The system of claim 1, further comprising:
a processor configured to provide video signals to said image source, and
the projection optics, the polarizing beam splitter, the retro-reflective screen, the quarter wave converter, and the output port comprise a head mounted display.

17. The system of claim 16, wherein the head mounted display comprises:
a shell integrally mounting the projection optics, the polarizing beam splitter, the retro-reflective screen, the quarter wave converter, and the output port, and
the shell includes video feeds from the processor to said image source.

18. The system of claim 1, wherein the quarter wave converter comprises a quarter wave retarder.

19. A method for image displaying, comprising:
generating image light from an image source;
projecting and focusing with projection optics said image light from the image source;
splitting at a beam splitter first polarized light of said image light having a first polarization into a first optical path separate from the projection optics and second polarized light of said image light having a second polarization into a second optical path separate from the projection optics;
converting said first polarized light into said second polarized light by a quarter wave converter;
retro-reflecting the first polarized light in the first optical path back on a same direction to said quarter wave converter as from said quarter wave converter, as a virtual image of the image light being focused; and
propagating the second polarized light by the beam splitter for viewing of the virtual image.

20. The method of claim 19, wherein splitting comprises reflecting and transmitting orthogonally polarized components of the image light respectively onto the first and second paths.

21. The method of claim 19, further comprising:
converting the first polarization to a quarter wave circular polarization state prior to reflection at a retro-reflective screen.

22. The method of claim 21, further comprising:
converting the quarter wave circular polarization state to the second polarization prior to transmission through the beam splitter to an exit pupil.

23. The method of claim 21, further comprising:
converting the quarter wave circular polarization state to the second polarization prior to reflection by the beam splitter to an exit pupil.

24. The method of claim 19, wherein generating image light comprises generating polarized image light having a polarization aligned with one of the first or second polarizations.

25. The method of claim 19, wherein generating image light comprises:
generating polarized image light; and
converting the polarized image light into at least one of the first or second polarizations.

26. The method of claim 19, wherein retro-reflecting comprises retro-reflecting at a retroreflective screen.

27. The method of claim 19, wherein splitting at a beam splitter comprises splitting at least one of a wire-grid polarizer, a dichroic cube polarizing beam splitter, and a multilayer birefringent cube polarizing beam splitter.

28. The method of claim 19, wherein generating image light comprises:
generating the image light from at least one of a liquid crystal display, a light emitting diode display, an organic light emitting diode display, liquid crystal on silicon display, and a ferroelectric liquid crystal on silicon display.

29. The method of claim 19, wherein generating image light comprises:
generating a non-polarized image light and filtering the non-polarized image light by a polarizing element having a polarization axis aligned with one of the first and second polarizations.

30. The method of claim 19, wherein generating image light comprises:
generating the image light and reflecting said image light to said beam splitter.

31. The method of claim 19, further comprising:
providing video signals to said image source.

32. The method of claim 19, wherein projecting said image light comprises:
projecting said image light into a head mounted display.

33. The method of claim 19, further comprising:
providing video signals to said image source, and
projecting said image light into a head mounted display.

34. The method of claim 19, wherein the converting said first polarized light into said second polarized light by a quarter wave converter comprises converting with a quarter wave retarder.

35. An image display system comprising:
an image generator configured to generate image light from an image source;
a projector configured to project and focus the image light;
means for splitting first polarized light of said image light having a first polarization into a first optical path separate from the projector and second polarized light of said image light having a second polarization into a second optical path separate from the projector;
means for converting said first polarized light into said second polarized light;
a retro-reflective screen on the first optical paths, configured to reflect the first polarized light back to the means for converting on a same direction as a virtual image of image light focused by projection optics of the projector; and
means for propagating the second polarized light for propagation by the means for splitting for viewing of the virtual image.

36. The system of claim 35, wherein the means for converting comprises a quarter wave retarder.

* * * * *